(12) United States Patent
Hutelmyer et al.

(10) Patent No.: US 12,526,324 B2
(45) Date of Patent: *Jan. 13, 2026

(54) CONTINUOUS IMPROVEMENT OF SECURITY DETECTION RULES

(71) Applicant: Target Brands, Inc., Minneapolis, MN (US)

(72) Inventors: Paul Hutelmyer, Minneapolis, MN (US); Adam Blake, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 278 days.

This patent is subject to a terminal disclaimer.

(21) Appl. No.: 18/406,597

(22) Filed: Jan. 8, 2024

(65) Prior Publication Data

US 2025/0227128 A1 Jul. 10, 2025

Related U.S. Application Data

(63) Continuation of application No. 17/587,303, filed on Jan. 28, 2022, now Pat. No. 11,909,773.

(60) Provisional application No. 63/170,205, filed on Apr. 2, 2021.

(51) Int. Cl.
*H04L 9/40* (2022.01)

(52) U.S. Cl.
CPC .................. *H04L 63/205* (2013.01)

(58) Field of Classification Search
None
See application file for complete search history.

(56) References Cited

U.S. PATENT DOCUMENTS

| 7,594,270 | B2 | 9/2009 | Church et al. |
| 8,499,330 | B1 | 7/2013 | Albisu et al. |
| 8,640,245 | B2 | 1/2014 | Zaitsev et al. |
| 9,183,385 | B2 * | 11/2015 | Chapman, II ......... G06F 21/554 |
| 9,344,457 | B2 | 5/2016 | Chapman, II et al. |
| 9,690,937 | B1 | 6/2017 | Duchin et al. |
| 11,140,061 | B1 | 10/2021 | Sanders et al. |
| 11,178,168 | B1 * | 11/2021 | Lin ..................... H04L 63/1433 |
| 11,909,773 | B2 * | 2/2024 | Hutelmyer ............ H04L 63/205 |
| 2010/0036779 | A1 | 2/2010 | Sadeh-Koniecpol et al. |
| 2010/0293617 | A1 * | 11/2010 | Wool .................. H04L 63/0227 726/25 |
| 2011/0126286 | A1 | 5/2011 | Nazarov |

(Continued)

*Primary Examiner* — Khang Do
(74) *Attorney, Agent, or Firm* — Barnes & Thornburg LLP

(57) ABSTRACT

Systems and methods disclosed can evaluate security detection rules in a network security computing environment. Results for a processed log of security events can be retrieved. The results can identify determined outcomes for instances triggering security detection rules. The security detection rules can detect specific behavior on a network by being processed against a log of security events. Scores for the security detection rules can be determined based on the results of the processed log of security events and the determined outcomes. The security detection rules can be ranked based on the scores, from highest to lowest score. The highest score can indicate that a corresponding rule is performing worst among the security detection rules and the lowest score can indicate that a corresponding rule is performing best among the security detection rules. A rules score report can be generated based on the ranked rules.

20 Claims, 13 Drawing Sheets

(56) References Cited

U.S. PATENT DOCUMENTS

| | | | |
|---|---|---|---|
| 2012/0167219 A1* | 6/2012 | Zaitsev | G06F 21/56 |
| | | | 726/24 |
| 2014/0096184 A1* | 4/2014 | Zaitsev | G06F 21/50 |
| | | | 726/1 |
| 2015/0373054 A1* | 12/2015 | Chapman, II | G06F 21/6218 |
| | | | 726/1 |
| 2016/0344738 A1 | 11/2016 | Dotan et al. | |
| 2017/0353459 A1* | 12/2017 | Lawrence | H04L 63/0263 |
| 2018/0255102 A1 | 9/2018 | Ward et al. | |
| 2019/0253455 A1* | 8/2019 | Xuan | H04L 41/0894 |
| 2019/0312910 A1 | 10/2019 | Convertino et al. | |
| 2020/0252422 A1* | 8/2020 | Davis | H04L 63/102 |
| 2020/0396222 A1 | 12/2020 | Gargaro et al. | |
| 2021/0110343 A1* | 4/2021 | Lagneaux | G06N 7/01 |
| 2021/0281610 A1* | 9/2021 | Applegate-Swanson | |
| | | | H04L 63/20 |
| 2021/0352013 A1* | 11/2021 | Devaraj | H04L 45/02 |
| 2022/0038471 A1* | 2/2022 | Sugarbaker | H04L 63/105 |
| 2022/0109701 A1 | 4/2022 | Zeng et al. | |
| 2022/0321606 A1* | 10/2022 | Hutelmyer | H04L 63/1433 |
| 2025/0227128 A1* | 7/2025 | Hutelmyer | H04L 63/1433 |

\* cited by examiner

FIG. 6

Case Outcome Output 910
FIG. 9

FIG. 10

```
Use Case Example Code 1000

//Use Case 1 – Lower score if the rule is identified as a test rule

Receive rules_list;
Select rule in rules_list;

For each rule in rules_list:
    If(rule.name == "test")
        {rule.score -= 10}
    Else
        {rule.score += 0}

//Use Case 2 – Increase score if the rule triggered over 50 times

Receive rules_list;
Select rule in rules_list;

For each rule in rules_list:
    If(rule.count >= 50)
        {rule.score += 10}
    Else
        {rule.score -= 5}
```

CONTINUOUS IMPROVEMENT OF SECURITY DETECTION RULES

CROSS-REFERENCE TO RELATED APPLICATIONS

This application is a continuation of U.S. patent application Ser. No. 17/587,303, filed Jan. 28, 2022, which claims the benefit of U.S. Patent Application Ser. No. 63/170,205, filed Apr. 2, 2021. The disclosures of the prior applications are considered part of (and are incorporated by reference in) the disclosure of this application.

TECHNICAL FIELD

This document generally describes devices, systems, and methods related to continuous improvement of security detection rules.

BACKGROUND

Entities, such as corporations, can implement security systems to protect against network security threats, internet security threats, hackers, and other malicious parties that intend to compromise the entity's network infrastructure. A security system deployed by the entity can detect malicious events and trigger rules to respond to such events, thereby protecting the entity from the malicious intent of the hacker. The entity can also implement rules that are triggered by different types of events that may not be malicious. Whether the rules are triggered in response to security events or non-malicious events, it can be challenging to determine whether such rules are working properly, whether such rules should be modified to be more effective, and/or whether one or more of the rules should be removed altogether.

Security detection rules can be triggered when potential threats are identified by a security system. Some detection rules can respond by sending alerts to the entity or other parties or relevant stakeholders. The alerts can notify such parties of a potential or actual threat. The alerts can also include an indication of how serious the threat may be.

Security threats and other rule-triggering events can and do change over time, and some existing detection rules may not pick up on or identify these events. Sometimes, detection rules can be checked or tested at predetermined time intervals by using SIEM attack techniques. However, the simulated attack techniques may not take into account most recent changes to events such as security threats. Detection rules may therefore not be as effective in addressing or responding to the changing events. Detection rules can and should be updated to respond to these new events, however, through the lifecycle of the detection rules, they may not be continuously checked to ensure that they are functioning properly.

SUMMARY

The document generally describes technology for continuously evaluating and improving security detection rules, which can be used to identify any of a variety of things occurring on a network, such as detecting potentially malicious network traffic and/or unauthorized attempts to access one or more network resources. For example, the effectiveness of security detection rules can change over time as both benign and malicious network traffic changes over time. Security detection rules can be specifically designated to distinguish between specific target network behavior and all other behavior on a network, so that the rules alert on only the specific target network behavior. However, as network traffic changes over time, security detection rules may end up capturing a greater proportion of the other behavior that they are not intended to alert on, and/or they may end up failing to alert on the specific target network behavior they are intended to capture. However, such changes and degradation in the performance of the security detection rules over time can easily go unnoticed and may result in a false sense that the security detection rules are functioning as intended. The disclosed technology can alleviate these (and/or other) issues by determining which security detection rules perform well or as intended, and which rules may need modification or some form of attention (e.g., human review and/or refinement).

For example, the disclosed technology can identify and differentiate between security detection rules that are functioning as intended and those in need of modification by scoring rules based on their performance during triggering events. Scoring can be based on any of a multitude of factors. For example, the scores can be based on a combination of how frequently a rule fires/is triggered, what outcomes result from triggering the rule, and whether the rule has been verified independently (e.g., by an engineer) as working properly. Rules having top scores can be flagged such that they can be reviewed and/or modified to perform better in subsequent triggering events. The rules can be compared to each other based on their assigned scores. A user, such as an analyst, can be presented with a visual timeline indicating scored performance of rules relative to each other. The developer can then have a better understanding of how to modify a particular rule to trigger or perform better in relation to other rules.

The disclosed technology can pool different information about triggered rules, include the rules, alerts, and cases. Using this information, the disclosed technology can score and rank the triggered rules. The disclosed technology can also provide users with easily searchable, visual, and analytic reports associated with the triggered rules.

Particular embodiments described herein include a system for evaluating security detection rules in a network security computing environment. The system can include a network security system configured to (i) receive a log of security events for a network and (ii) process the log of security events against a plurality of security detection rules. Each of the plurality of security detection rules can detect a specific network behavior on the network through being processed against the log of security events. The system can also include a log results data store that can receive, from the network security system, results for the processed log of security events against the plurality of security detection rules, and store the results for the processed log of security events. The system can also include a detection hub system for assessing the plurality of security detection rules that were triggered by processing of the log of security events. The detection hub system can retrieve, from the log results data store, the results for the processed log of security events. The results can identify determined outcomes for instances triggering the plurality of security detection rules. The detection hub system can also determine scores for the plurality of security detection rules based on the results of the processed log of security events and the determined outcomes, and rank the plurality of security detection rules based on the scores. The plurality of security detection rules can be ranked from a highest score to a lowest score. The highest score can indicate that a corresponding rule can be performing worst among the plurality of security detection rules and the lowest score can indicate that a corresponding rule can be performing best among the plurality of security detection rules. The detection hub system can also generate, based on the ranked rules, a rules score report. The system can also include a user computing device having a graphical user interface (GUI) display. The user device can receive, from the detection hub system, the rules score report, output, for display at the GUI display, the rules score report, modify, based on the rules score report, one or more of the rules identified in the rules score report, and store, in a rules data store, the modified one or more rules.

In some implementations, the system can optionally include one or more of the following features. For example, the detection hub system can determine scores for the plurality of security detection rules by determining, for each rule of the plurality of security detection rules, a number of times that the rule was properly triggered, assigning a low score based on the number of times that the rule was properly triggered exceeding a first threshold value, and assigning a high score based on the number of times that the rule was properly triggered being less than the first threshold value. The detection hub system can also adjust the scores for the plurality of security detection rules. Adjusting the scores can include (i) decreasing one or more scores based on one or more corresponding rules being triggered more than a second threshold value and (ii) increasing the one or more scores based on the one or more corresponding rules being triggered less than the second threshold value. Adjusting the scores for the plurality of security detection rules can also include (i) increasing one or more scores based on a quantity of cases that trigger one or more corresponding rules exceeding a third threshold value and (ii) decreasing the one or more scores based on the quantity of cases that trigger the one or more corresponding rules being less than the third threshold value. Adjusting the scores for the plurality of security detection rules can include (i) increasing one or more scores based on a type of one or more corresponding rules being associated with high risk threats and (ii) decreasing the one or more scores based on the type of the one or more corresponding rules being associated with non-high risk threats. Adjusting the scores for the plurality of security detection rules can include (i) decreasing one or more scores based on modifications being made to one or more corresponding rules in less than a predetermined timeframe and (ii) increasing the one or more scores based on the modifications being made to the one or more corresponding rules in greater than the predetermined timeframe.

As another example, the detection hub system can store, in the rules data store, at least one of (i) the scores for the plurality of security detection rules, (ii) the ranked rules, and (iii) the rules score report.

The detection hub system can also adjust the scores for the plurality of security detection rules relative to scores of each nearest neighbor of a respective rule. Ranking the plurality of security detection rules based on the scores of each nearest neighbor of the respective rule can include generating an initial ranking of the plurality of security detection rules based on the highest score to the lowest score, applying a use case to the respective rule, decreasing, in response to determining that the respective rule satisfies the use case, a score of the respective rule relative to scores of each nearest neighbor of the respective rule in the initially ranked rules, increasing, in response to determining that the respective rule does not satisfy the use case, the score of the respective rule relative to the scores of each nearest neighbor of the respective rule in the initially ranked rules, and generating a finalized ranking of the rules. The respective rule can satisfy the use case when the respective rule is triggered less than a predefined threshold value. The respective rule may not satisfy the use case when the respective rule is triggered more than the predefined threshold value. The respective rule can satisfy the use case when the respective rule is identified as a non-malicious event. The respective rule may not satisfy the use case when the respective rule is identified as a malicious event. The respective rule can satisfy the use case when the respective rule has been modified within a predetermined timeframe. The respective rule may not satisfy the use case when the respective rule has not been modified with the predetermined timeframe.

As another example, decreasing the score of the respective rule relative to the scores of each nearest neighbor of the respective rule can include subtracting a predetermined amount from the score of the respective rule such that the score of the respective rule is less than at least one score of at least one nearest neighbor of the respective rule. Increasing the score of the respective rule relative to the scores of each nearest neighbor of the respective rule can include adding a predetermined amount to the score of the respective rule such that the score of the respective rule is greater than at least one score of at least one nearest neighbor of the respective rule.

Preferred embodiments described herein can also include a method for evaluating security detection rules in a network security computing environment. The method can include retrieving, by a computing system, results for a processed log of security events. The results can identify determined outcomes for instances triggering a plurality of security detection rules. Each of the plurality of security detection rules can detect a specific network behavior on a network through being processed against a log of security events. The method can also include determining, by the computing system, scores for the plurality of security detection rules based on the results of the processed log of security events and the determined outcomes and ranking, by the computing system, the plurality of security detection rules based on the scores. The plurality of security detection rules can be ranked from a highest score to a lowest score. The highest score can indicate that a corresponding rule can be performing worst among the plurality of security detection rules and the lowest score can indicate that a corresponding rule can be performing best among the plurality of security detection rules. The method can also include generating, by the computing system, a rules score report based on the ranked rules.

In some implementations, the preferred embodiment can include one or more of the features described above.

The devices, system, and techniques described herein may provide one or more of the following advantages. For example, the disclosed technology can provide for dynamic adjustment of security detection rules as security events and/or structure of events change over time. A network detection rule can trigger appropriately at a current time but may not trigger appropriately at a later time in response to new threats or security events. Rules that do not consistently trigger or perform as expected can receive higher scores, thereby putting users on notice that the rules may need to be looked at. When the rule does not trigger appropriately at the later time, the rule can receive a higher score, which can put response analysts on notice that the rule is not performing as intended and may need to be modified, especially before other rules need to be modified or looked at. Since rules can be continuously monitored and scored whenever they are triggered, users can more frequently see how the rules perform relative to each other. Therefore, users can make more dynamic and responsive adjustments to the rules, and more specifically, to high scoring rules.

As another example, dynamic ranking of rules relative to each other can help users visualize performance of such rules. Scored rules can be presented to the users in visuals, such as pie charts, graphs, bar charts, etc. These visuals can help the users understand how important it can be to address certain rules over others. Rules can be graded on a myriad of factors that may indicate misaligned detection, with a lower score indicative of greater rule accuracy. These visuals can also help the users understand what changes need to be made to the greater-scoring rules. Rules that receive greater scores relative to each other can be ranked higher and therefore more easily brought to the attention of the users. Such visualizations can assist the users to prioritize which rules to review, address, and/or modify, and which rules may not require immediate review. As a result, the users may not build a backlog of rules that need to be addressed but which cannot be addressed all at the same time. Building a backlog of rules to address can be burdensome on the users, especially since new threats or events can arise and cause additional rules to not perform as intended. The more rules that get added to the backlog, the more challenging it can be for the users to tackle all the rules that need attention and to modify the rules before additional or new threats or events occur. Therefore, the users can continuously improve rules by focusing on the rules with higher scores, which can be visually brought to the more immediate attention of the users than rules with lower scores.

As another example, the rules can be scored based on a variety of factors, which can create more robust and holistic guidance about why the rules may or may not be performing as intended. Instead of merely scoring the rules based on whether they triggered or responded correctly to a security event, the disclosed technology can provide for scoring the rules based on how many times the rule was triggered, outcomes for whenever the rule was triggered, a type of rule, a source of a threat, a severity of the threat, a frequency of modifying the rule, and historic trends associated with the rule. Additional factors can also be considered when scoring the rules. Scoring based on the variety of factors can make it easier for the users to assess which rules should be looked at first and how the users should address the rules that need to be looked at. Rule scoring can also influence security response by providing additional context for how a rule has performed historically and how a security event has been previously addressed.

The details of one or more implementations are set forth in the accompanying drawings and the description below. Other features and advantages will be apparent from the description and drawings, and from the claims.

BRIEF DESCRIPTION OF THE DRAWINGS

FIG. 6 is an example GUI report depicting scored rules that are ranked from highest score to lowest score.

FIG. 9 depicts example GUI outputs for case outcomes by rule.

FIG. 10 is example use case code for ranking scores relative to each other.

Like reference symbols in the various drawings indicate like elements.

DETAILED DESCRIPTION OF ILLUSTRATIVE EMBODIMENTS

Figure 1:
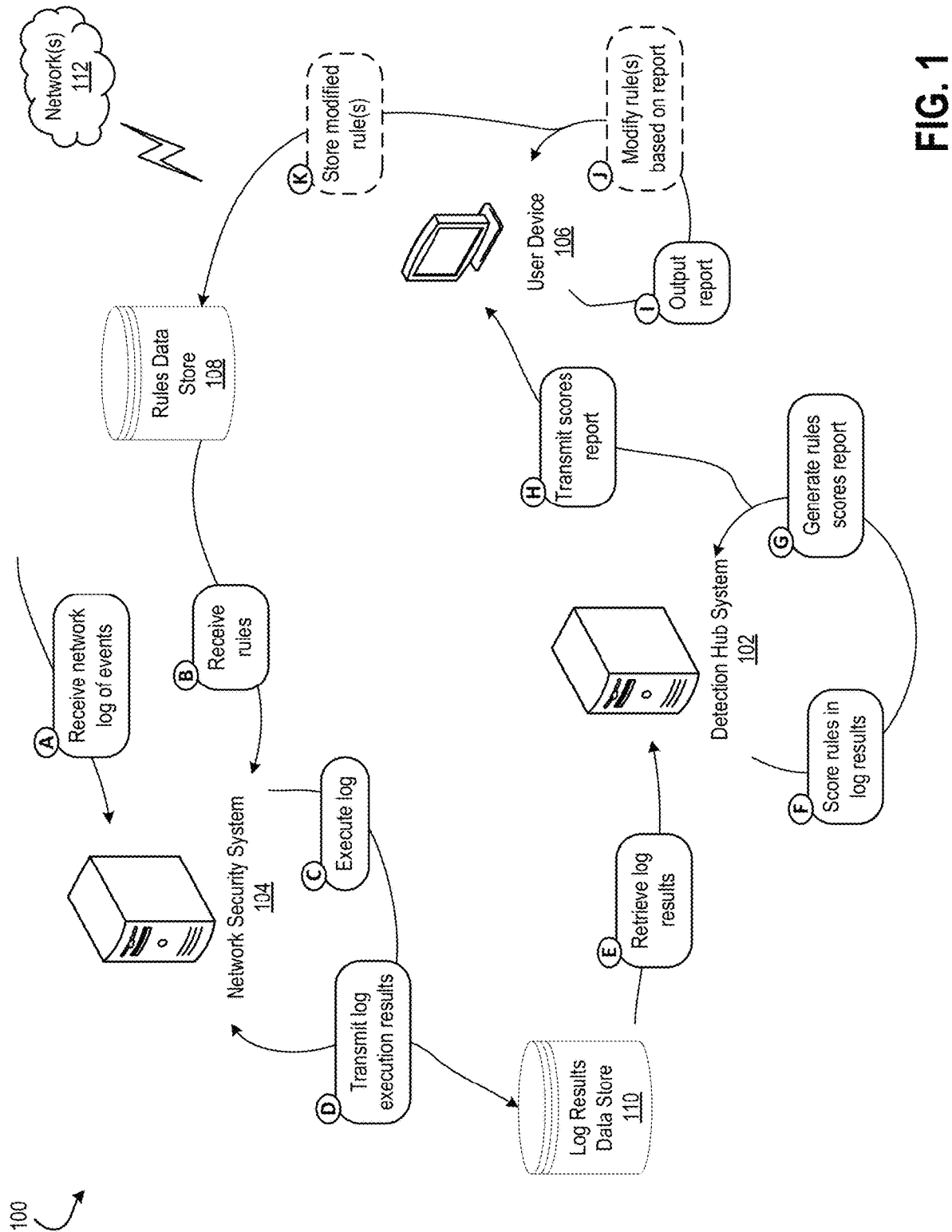
FIG. 1 is a conceptual diagram of an environment for scoring rules that are triggered in response to security events.

This document generally relates to technology for determining which security detection rules perform well and which rules may need attention or modification. Users, such as engineers, can create rules that can be triggered in response to different types of security events. As the rules are deployed in a security system, cases can be generated for each time that the rules are triggered. Outcomes for those cases can be determined. For example, an outcome can be that the rule properly responded to or thwarted a security attack. Another example outcome can be that the rule responded to an event that was not an attack as if the event were in fact an attack. Other outcomes can include that a case was not identified or a case was identified as either malicious or non-malicious. Using the disclosed techniques, case outcomes can be analyzed to determine whether or not the rules require some attention/modifications. Based on the case outcomes, the rules can be scored and ranked relative to each other. The rules can be scored every hour. One or more other time intervals can be used for scoring the rules. Moreover, in some implementations, the scores can also be based on information or activity (e.g., previous case outcomes, modifications, etc.) that occurred over the course of the past 180 days. The timeframe can be extended or shortened based on user and/or entity preference.

All rules can be scored based on their performance and a variety of factors. A combination of factors can be considered to determine a holistic performance score for the rule. Rules with highest scores can be flagged and/or presented to users, such as engineers, as the rules that need more immediate attention and/or modification. The disclosed technology can provide for dynamic adjustment of rules as security events and structures of such events change over time. For example, a rule may trigger and perform properly at a first time, but at a second time, the rule may not trigger properly as a result of a change in events that triggers the rule. The rule can then be brought to the immediate attention of the users such that the users can modify the rule to respond to the change in the triggering event(s).

The ranked and scored rules can be presented to the users via visualizations, such as graphs and charts. The visualizations can be slices in time, depicting performance or scoring of rules relative to each other over certain periods of time. The users can choose the time periods for displaying the ranked rules. The users can also choose trending timelines to depict the ranked rules. The users can also change views of information, from macro to micro levels. For example, the users can view an overview of executed logs of events. The users can narrow down into particular case outcomes and/or rules from a particular executed log. The users can also further view information about negative factors that impact higher scored (and therefore higher ranked) rules, which can assist the users in understanding why such rules performed poorly. Such different visualizations and reviews can assist the users in better understanding what rules may require attention and immediate modification.

Therefore, the disclosed technology can provide network detection and security using a rule-based performance scoring assessment. The disclosed technology also provides for scoring security detection rules using a multitude of factors to bring attention to rules that may require dynamic and/or immediate adjustment in response to real-time changes in security events. Moreover, the disclosed technology provides visual timelines and other visual interfaces and displays of scored rule performance, which can assist the users in understanding how best to approach and/or modify triggered, scored rules.

Referring to the figures, FIG. 1 is a conceptual diagram of an environment 100 for scoring rules that are triggered in response to security events. A detection hub system 102, network security system 104, user device 106, rules data store 108, and log results data store 110 can be in communication (e.g., wired and/or wireless) via network(s) 112.

A network log of events can be received at the network security system 104 (A). The network log of events can be a record of actions or activity in the network, such as calls to objects, attempts at authentication, and security threat attempts or attacks. The network security system 104 can also receive rules from the rules data store 108 (B). The system 104 can receive the rules before, during, or after receiving the network log of events. Once the system 104 has the rules, the system 104 can execute the log of events (C). Executing the log of events can include performing one or more actions or activities in the log using the rules. After executing the log, the system 104 can transmit, to the log results data store 10, log execution results (D). The log execution results can include, but is not limited to, information about each of the executed events, what rules were triggered, when the rules were triggered, how the rule performed in response to being triggered, outcomes for executing the events, and outcomes for each of the triggered rules. The log results data store 110 can store results for all the logs that are executed by the system 104.

The detection hub system 102 can retrieve the log results from the log results data store 110 (E). In some implementations, the system 102 can retrieve the log results as soon as or immediately after they are generated by the network security system 104 and transmitted to the data store 110. In some implementations, the system 102 can retrieve the log results at a later, predetermined time. For example, if the system 102 is configured to score and rank triggered rules every hour, then the system 102 can retrieve the log results every hour.

The detection hub system 102 can score the triggered rules in the log results using the techniques described herein (F). As part of scoring, the system 102 can also rank the rules relative to each other and based on their scores. The detection hub system 102 can also generate one or more rules score reports (G). As described and depicted throughout this disclosure, the system 102 can generate a report of the ranked rules. The system 102 can also generate reports for each of the triggered rules, cases and/or case outcomes based on triggered rules, and/or executed logs of events. The system 102 can transmit the generated reports to the user device 106 (H).

The user device 106 can output the reports (I). One or more users can view the reports. The users can optionally generate new reports based on the received score reports to assist the users in visualizing each of the triggered rules and determining what rules should be modified and/or addressed. Therefore, the user device 106 can optionally modify one or more rules based on the reports (J). In some implementations, modifications can be recommended by the detection hub system 102. The user can select or approve the modifications. The system 102 and/or the user device 106 can then perform the modifications. In some implementations, the system 102 and/or the user device 106 can modify the rule(s) without user review or acknowledgement. In some implementations, the user can perform modifications on the rule(s) based on the reports and without assistance or intervention from the detection hub system 102 and/or the user device 106. Once the rule(s) are modified, they can be stored in the rules data store 108 (K). The modified rule(s) can then be triggered, scored, and ranked through continuous improvement, as described throughout this disclosure.

As shown in FIG. 1, items A-K demonstrate a closed feedback loop. This closed feedback loop can be advantageous to provide for dynamic and continuous review and analysis of rules. As a result, the users can stay up to speed with changes in the network, changes in security threats, and overall changes in security events such that the users can develop or enhance rules to respond to such changes. The dynamic and continuous review can also be advantageous to provide the users with a more manageable workflow. After all, the users can be alerted about high scoring rules, which can indicate that such rules need to be addressed before other rules with lower scores. The users may not waste time addressing other rules during each scoring and/or reporting cycle. Moreover, once the users modify a high-scoring rule and the rule is triggered again during execution of the log of events, the users can see in the score reports whether their modifications were effective. In other words, if the modifications were effective, then the modified rule may not be ranked and/or may not have a high score relative to other rules. The users can then focus their attention on addressing other high ranked rules.

Figure 2:
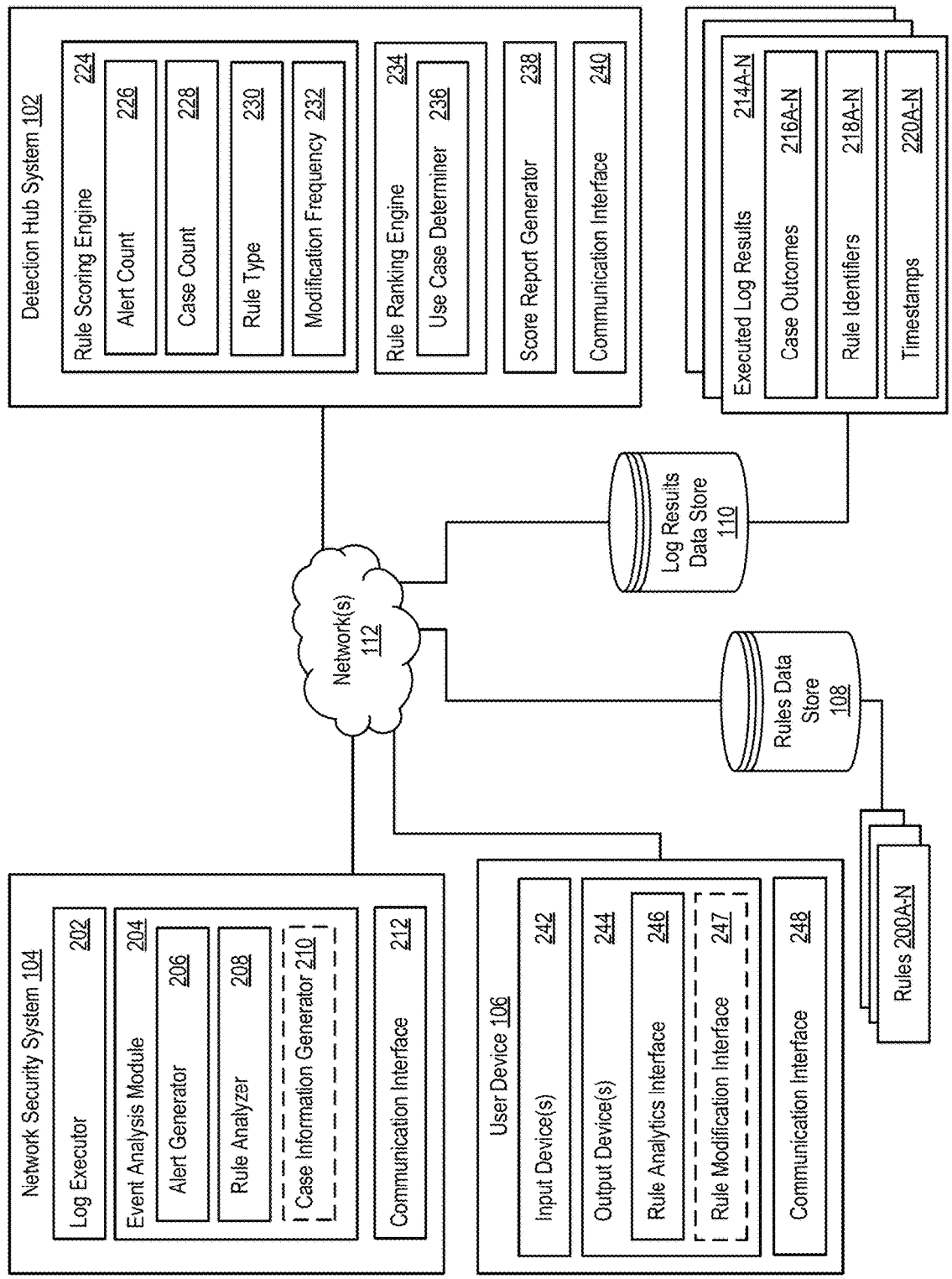
FIG. 2 is a system diagram of components used in implementing one or more of the techniques described herein.

FIG. 2 is a system diagram of components used in implementing one or more of the techniques described herein. The detection hub system 102, network security system 104, user device 106, rules data store 108, and log results data store 110 can communicate via the network(s) 112.

The network security system 104 can include a log executor 202, an event analysis module 204, and a communication interface 212. The log executor 202 can be configured to execute received network logs of events. The executor 202 can also receive any one or more of rules 200A-N from the rules data store 108 to execute each of the events in the network logs of events.

The event analysis module 204 can be configured to determine information or actions associated with each of the events that are executed in the logs of events. The module 204 can include an alert generator 206, a rule analyzer 208, and an optional case information generator 210. As described herein, when an event is executed, the event can trigger one or more rules. A triggered rule can require alerting one or more stakeholders, such as other devices, computer systems, an entity, users, engineers, etc. The alert generator 206 can generate such alerts for one or more triggered rules, whether or not an appropriate rule was triggered or an alert was generated for a false alarm. The alert generator 206 can also transmit the alert(s) to any one or more stakeholders who are supposed to receive the alert(s).

The rule analyzer 208 can be configured to determine which rule should be triggered when executing an event and what actions or activity occurs in response to triggering the rule. As mentioned, the network security system 104 can receive the rules 200A-N from the rules data store 108. The rule analyzer 208 can identify which of the rules 200A-N to apply. The rule analyzer 208 can also collect information about the rules that are applied/triggered. The collected information can include, but is not limited to, an alert, a threat or event type, a timestamp, a rule type, an outcome of triggering the rule, etc.

The case information generator 210 can be configured to determine information about the executed event. For example, the generator 210 can build a record about each executed event. The record can include information such as what rule was triggered, a rule identifier, whether an alert was generated, when the alert was generated, how the triggered rule responded to the event, and an outcome of the event. Such records can be added to a record associated with the executed log of events.

The record associated with the executed log of events can be stored in the log results data store 110. The log results data store 110 can also store records associated with each of the executed events within executed log results 214A-N. The log results 214A-N can include case outcomes 216A-N, rule identifiers 218A-N, and timestamps 220A-N. In some implementations, the case outcomes 216A-N, rule identifiers 218A-N, and timestamps 220A-N can be associated with the particular log that was executed. In some implementations, the information 216A-N, 218A-N, and 220A-N can be associated with particular events that were executed within the executed log.

The detection hub system 102 can include a rule scoring engine 224, a rule ranking engine 234, a score report generator 238, and a communication interface 240. As described throughout, the system 102 can retrieve, from the log results data store 110, the executed log results records 214A-N. Using such information 214A-N, the rule scoring engine 224 can score each of the rules that were triggered by events when a log was executed.

The detection hub system 102 can also determine what rules and/or scores are important and/or should be weighted more than others. This determination can be based on what events are executed in the log, what rules were triggered, whether the rules have been recently modified, whether the rules have triggered over a predetermined number of times, what types of threats are appearing in the results for the executed log, etc. As an illustrative example, the detection hub system 102 can determine that any rules that are triggered and related to point-of-sale (POS) terminals can be assigned scores that are weighted more heavily than rules that are triggered but not related to POS terminals. Therefore, rules that are related to POS terminals can receive higher scores than other rules, even if the rules related to the POS terminals may not have alerted as frequently as the other rules or been recently modified. Such prioritization can be advantageous to assist the users or engineers in better prioritizing, addressing, and/or modifying rules.

Figure 3A:
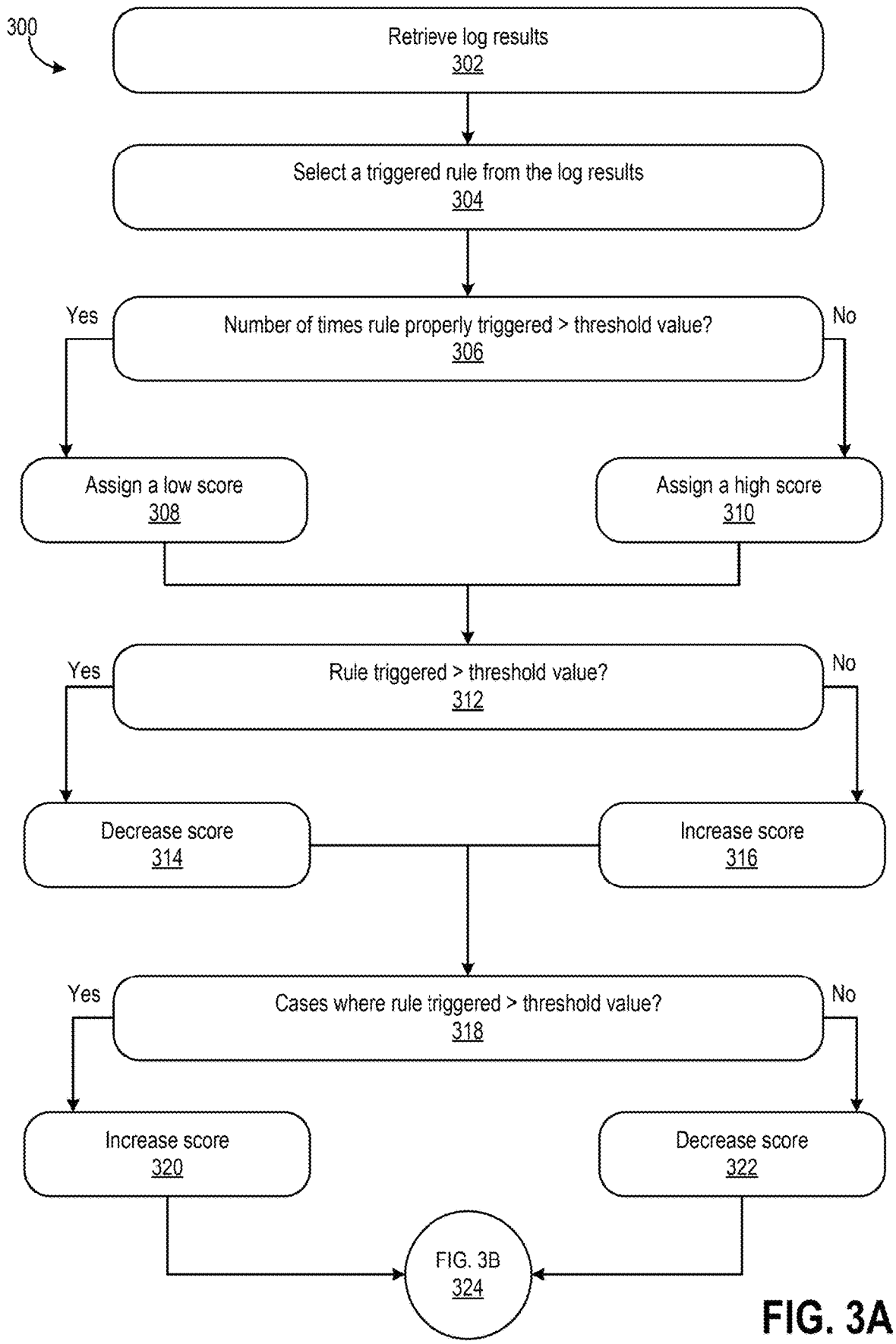
FIGS. 3A-B is a flowchart of a process for scoring a triggered rule.
Figure 3B:
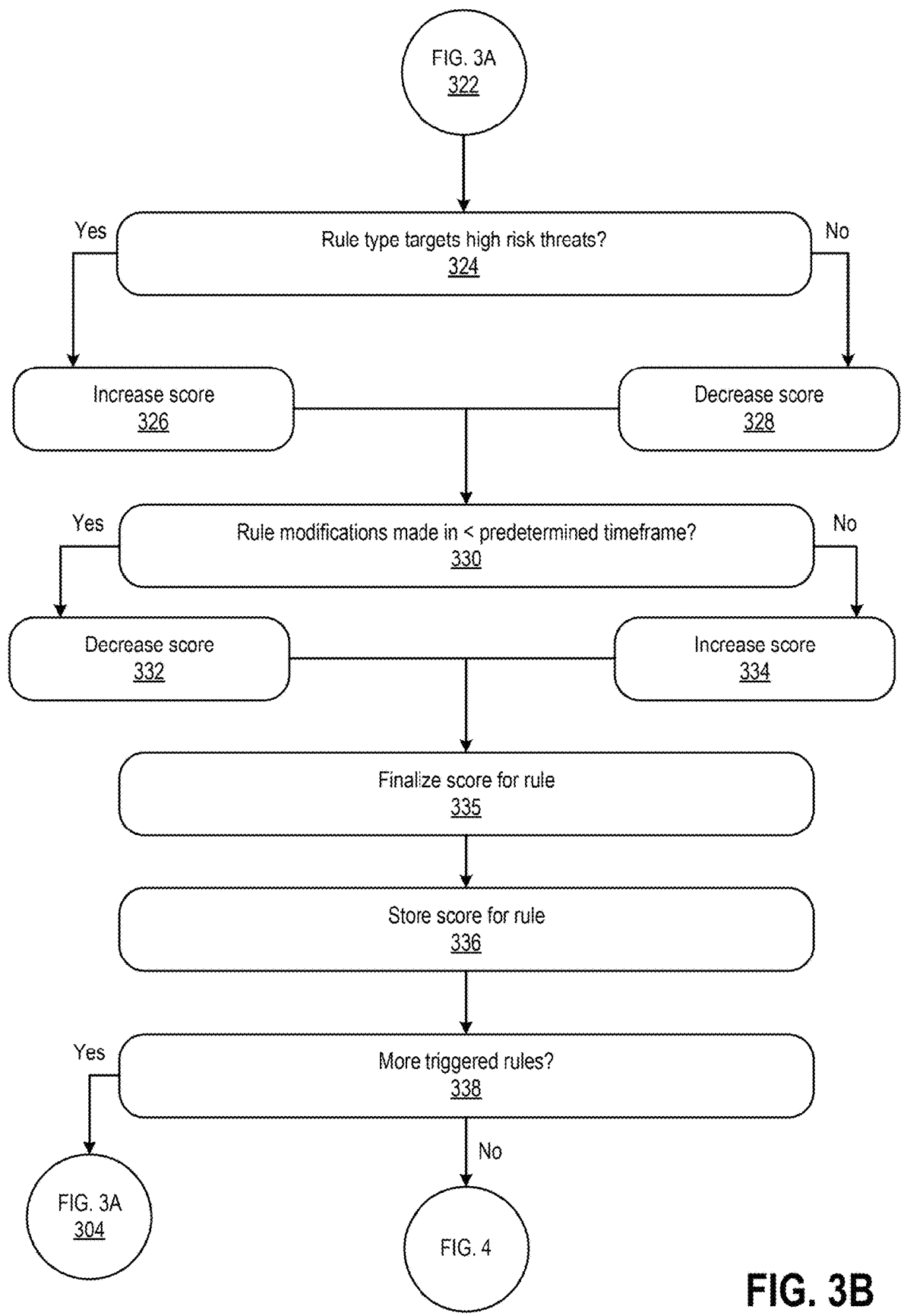

The rule scoring engine 224 can include one or more modules for determining sub-scores that can be used to generate an overall score for each of the triggered rules (e.g., refer to FIGS. 3A-B). The sub-scores can be combined and weighted relative to each other for each rule. The rule scoring engine 224 can include an alert count 226, a case count 228, a rule type 230, and a modification frequency 232. The engine 224 can include one or more fewer or additional modules that can be used to determine sub-scores for the triggered rule. Moreover, the rule scores can trend over time, however they can be static for every hour or predetermined time interval for scoring triggered rules. Therefore, the rule scores can change dynamically and/or every 24 hours or other predetermine periods of time.

The alert count 226 can be configured to determine how many times, in an executed log, that a particular rule was triggered and caused an alert to be generated. In some implementations, the more alerts that are generated, the higher a score can be for the associated rule. If the rule is alerting a lot (e.g., over a predetermined threshold amount), then there can be a problem with the rule and it may need to be addressed by a user, such as a developer. Thus, the alert count can be used, by the scoring engine 224, to assign a higher score to the rule. In some implementations, if the rule rarely alerts over a predetermined period of time (e.g., 180 days), then the rule can be assigned a lower score. This lower score can also be based on whether the rule is intended to alert and/or whether the rule responds to malicious or non-malicious events. In some implementations, if the rule alerts a minimum threshold number of times during a predetermined time period (e.g., 1,000 alerts over 30 days), then the rule can be assigned a higher score, because it is likely that the rule is not supposed to alert the minimum threshold number of times and during the predetermined time period. Therefore, that rule may require immediate attention in comparison to a rule that alerts often but may not meet the minimum threshold number of times during the predetermined time period. In some implementations, if the rule does not alert at all, the rule can also be assigned a higher score because this can indicate that the rule is not performing as intended. The users can determine what conditions or threshold values indicate a higher score or a lower score. For example, in some implementations and based on a type of the rule, the users may determine that a particular rule is functioning properly if it does not trigger. Therefore, that particular rule can be assigned a low score relative to others, even if the overall scoring requires assigning a high score to rules that do not alert at all.

The case count 228 can be configured to determine how many times, in the executed log, a triggered rule caused identification of a case. The case count 228 can also be configured to determine case outcomes over a predetermined time period. For example, a higher score can be assigned to a rule that caused identification of a quantity of cases that were all false positives, where the quantity of cases exceeds a minimum threshold value (e.g., 50 cases) over the predetermined time period (e.g., past 180 days). Therefore, if the rule triggered 50 cases over the past 180 days but the outcome for the rule was poor because all 50 cases were false positives (e.g., no confirmed cases), then the rule may require more immediate attention and/or modification than a rule that triggered fewer cases but had more positive outcomes (e.g., successfully thwarted a real threat). After all, the rule may require modification because the rule is only returning poor outcomes of false positives and no or few true positives. As another example, if a rule triggered only 10 times but each time, the case outcome was malicious intent, then the rule can be assigned a lower score because this can indicate that the rule was functioning properly.

The rule type 230 can be configured to determine a rule type for each of the triggered rules in the executed log. The rule type can include, but is not limited to, a source of a threat or event, whether a threat actor is intentionally targeted by the triggered rule, how big of a threat is the triggered rule trying to or supposed to identify, whether the triggered rule is intended to respond to a threat or remain silent and report out, and whether the triggered rule is intended to identify a threat or merely respond to non-threatening events. For example if the rule was triggered in response to a new threat source, the rule may receive a lower score because the rule was able to respond to the new threat source and therefore may not require immediate modification. As another example, if the triggered rule is intended to respond to big threats but was triggered for a small or minor threat, the rule can be assigned a higher score because the rule may not be responding appropriately to its intended threats. As another example, if the triggered rule is supposed to respond to an attack but, when triggered, it remained silent, the rule can be assigned a higher score since it may require more immediate attention such that it can perform properly. In some implementations, rules that are associated with large security threats can be assigned higher scores than rules that are associated with small security threats or no security threats. Rule types can be determined by the detection hub system 102. The rule types can alternatively or additionally be determined by the users.

The modification frequency 232 can be configured to determine how many times and/or how often that a triggered rule, in the executed log, was modified over a predetermined period of time. If the rule was recently modified (e.g., at a time immediately prior to being triggered during log execution), the rule can be assigned a lower score. This is because a user already looked at and potentially modified the rule so the rule does not need to be immediately looked at or updated. The score, however, can change by the day, depending on how many times the rule alerts. For example, if the rule was modified yesterday and today the rule alerts over a predetermined threshold number of times, then even though the rule was recently looked at, it may not be functioning properly (otherwise it would have alerted less over the course of a day). Therefore, the rule can be assigned a higher score such that the user can become aware that perhaps the modifications made yesterday are not effective. As another example, if a rule is triggered during execution of the log and the rule has not been modified over a period of time that exceeds the predetermined period of time (e.g., 30 days), then the rule can be assigned a higher score. It can be possible that the rule may not be responding to new changes in events or security threats, even if the rule is properly responding to older events and/or security threats.

Figure 4:
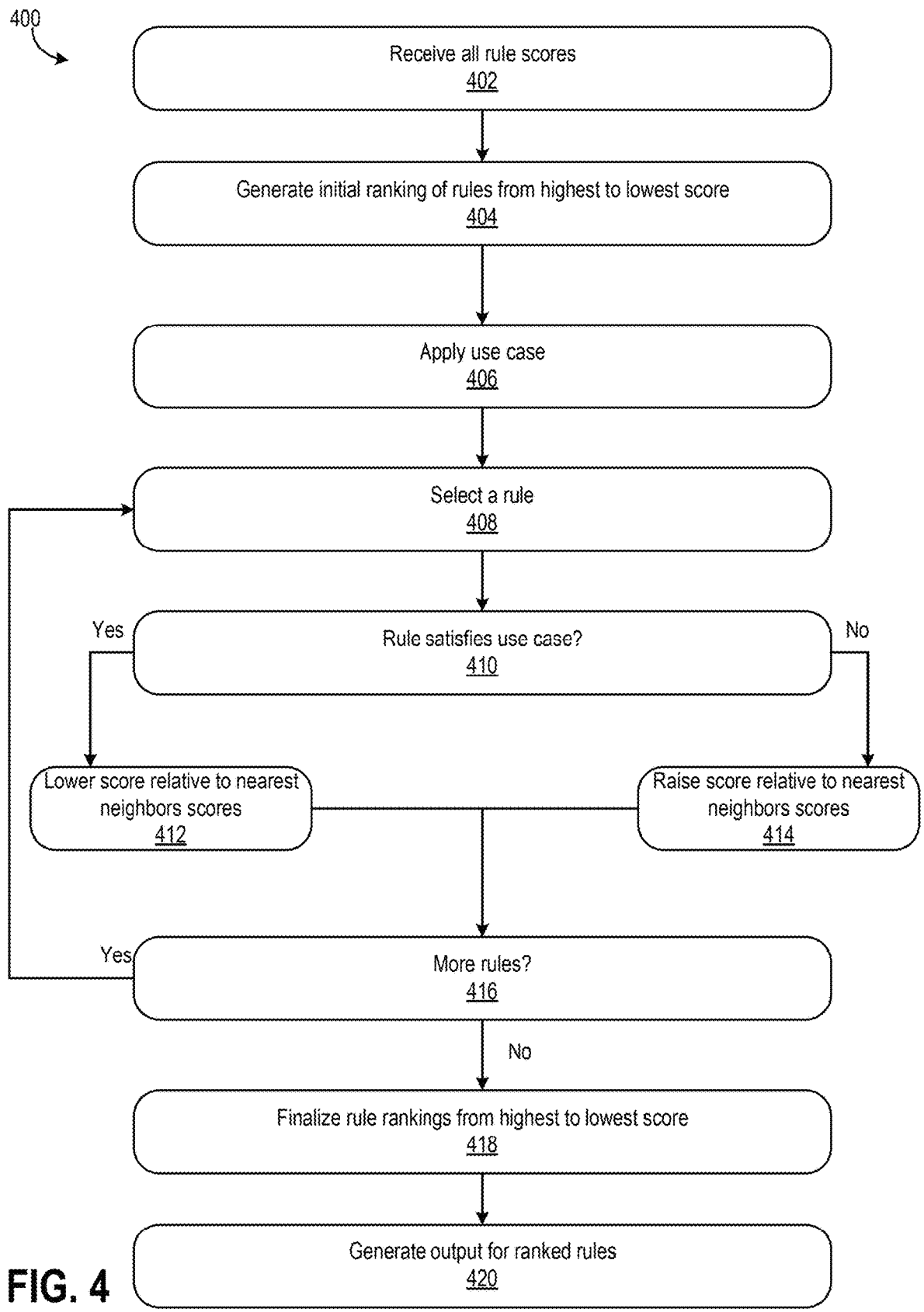
FIG. 4 is a flowchart of a process for ranking triggered rules that have been scored.

Once the rule scoring engine 224 scores each of the triggered rules in the executed log, the rule ranking engine 234 can determine a ranking of the rules based on their scores (e.g., refer to FIG. 4). The engine 234 can include a use case determiner 236. The user case determiner 236 can be configured to determine what use cases to apply to the scored rules (e.g., refer to FIG. 10). The determine 236 can also apply the use cases to the scored rules. The use cases can be used to rank the scored rules relative to each other. For example, the rules can be initially ranked from highest to lowest score by the rule ranking engine 234. A use case can then be applied by the use case determiner 236. A rule that satisfies the use case, for example, can have its score reduced by a certain amount. A rule that does not satisfy the use case, for example, can have its score increased by a certain amount. Therefore, rules whose scores are reduced can be moved lower in the overall rule rankings while rules whose scores are increased can be moved higher in the overall rule rankings. The rule ranking engine 234 can then finalize a list of the ranked rules once one or more use cases are applied by the use case determiner 236.

The score report generator 238 can be configured to generate reports and other visuals for each of the scored rules as well as the overall ranked rules (e.g., refer to FIGS. 5-9). The generator 238 can also be configured to generate reports or other visuals about each of the executed logs of events.

The user device 106 can include input device(s) 242, output device(s) 244, and a communication interface 248. The input device(s) 242 can include any one or more of a touchscreen, mouse, keyboard, microphone, or other similar devices. The output device(s) 244 can include any one or more of a screen (e.g., LCD, touchscreen), audio, or other visual output mechanisms. Moreover, a rule analytics interface 246 and an optional rule modification interface 247 can be displayed at a graphical user interface (GUI) display of the output device(s) 244.

The rule analytics interface 246 can present, to the user, the score reports that were generated by the detection hub system 102. The interface 246 can be interactive, providing the user with an ability to select different reports, rules, case outcomes, and/or executed logs to be displayed (e.g., refer to FIGS. 5-9). The rule analytics interface 246 can also visually present trends over time for different rules, case outcomes, and/or executed logs. For example, the user can view how a particular rule trended over a desired amount of time (e.g., 7 days, 30 days, 180 days, etc.). The user can view whether or not modifications to the rule made the rule perform better over the course of the desired amount of time. As an example, a rule can be considered effective if the rule starts with a high score and then receives lower scores over time as modifications are made to the rule and/or the network environment and events change. A lower trending score over time can indicate that the rule has been appropriately looked at and addressed to perform better and/or as intended.

In some implementations, the rule analytics interface 246 can present trending based on one or more different characteristics. For example, the interface 246 can present trending based on which rules fired or triggered the most during the desired amount of time. The interface 246 can present trending based on top 10 (or another predetermined amount) rules that have not been modified as frequently or as recently as other rules. The interface 246 can also present trending based on most recently changed or modified rules, most recently added or new rules, and/or different rule types.

The rule modification interface 247 can present, to the user, an interface for modifying any one or more of the rules that were triggered, scored, and/or ranked. For example, based on information visually presented in the rule analytics interface 246, the user can decide to review and/or modify one or more of the presented rules in the rule modification interface 247. Any modifications made to the rule in the interface 247 can then be saved by transmitting the modified rule to the rules data store 108 for storage. Thus, the modified rule can be triggered when network logs of events are executed at the network security system 104. The modified rule can be scored and ranked by the detection hub system 102 and the user can view, at the rule analytics interface 246, whether or not the modified rule performed better than before the rule was modified.

The rule modification interface 247 can be optional because, in some implementations, the detection hub system 102 can autonomously update or modify one or more of the scored and ranked rules. For example, the system 102 can suggest one or more modifications to one or more of the rules. The suggestion(s) can be presented to the user at the rule analytics interface 246 of the user device 106. The user can accept or approve the suggestion(s), which then causes the detection hub system 102 to automatically implement the suggested modification(s). In some implementations, as described herein, the system 102 can also autonomously or automatically perform the modification(s) without receiving approval from the user at the user device 106.

Finally, the communication interfaces 212, 240, and 248 can provide for one or more of the components described herein to communicate with each other over the network(s) 112.

FIGS. 3A-B is a flowchart of a process 300 for scoring a triggered rule. The process 300 can be performed by the detection hub system 102. One or more of the blocks in the process 300 can also be performed by other similar computing systems.

Referring to the process 300 in both FIGS. 3A-B, the detection hub system 102 can retrieve a log results (302). As described herein, the log results can be retrieved from a data store, such as the log results data store 110 (e.g., refer to FIGS. 1-2). The log results can be a record of all rules, associated cases, and case outcomes from executing a log of security events. The process 300 can be performed for each of the rules recorded in the log results. The system 102 can select a triggered rule from the log results (304). The system 102 can then score the selected rule.

To score the rule, the system 102 can determine a number of times that the selected rule properly triggered more than a threshold value (306). For example, the system 102 can count how many times the rule had a positive outcome and was reported as such within the log record. If the number of times that the rule properly triggered (e.g., the count) exceeds the threshold value, then a lower score can be assigned to the rule (308). This can indicate that the rule is performing as intended or properly and therefore may not require immediate attention. In some implementations, if the count is greater than a first threshold value but less than a second threshold value, then the score can be lowered. If the count is greater than the first threshold value and greater than the second threshold value, then the rule can be assigned a higher score. This is because the rule may be under-alerting, which can result in the rule not properly triggering in response to new events or new variants of the events it is intended to respond to. The rule, in other words, may be limited in its applicability and thus may not be effective in capturing different variants of the intended event. Having 100% accuracy in triggering may be a sign that the rule should be reviewed.

If the number of times that the rule properly triggered is less than the threshold value, then a higher score can be assigned (310). This can indicate that the rule is not performing as intended. The rule may be triggering more often for false positives than it is triggering for true positives. Therefore, a high score can bring attention to the rule such that the users can review and modify it. As another example, the rule may be triggering an amount of times that exceeds a threshold value but a ratio or delta of true positive triggers to the number of overall triggers for that rule can be so large (e.g., exceeding another threshold value), that the rule can be assigned a higher score. This can indicate that the rule is supposed to trigger but it is not triggering in response to the right or the intended events.

After assigning a score to the rule, the system 102 can determine whether the rule triggered more than a threshold value (312). In other words, it can be determined how many times the rule, overall, appears in the log record. If the rule triggered more than the threshold value, then the score for the rule can be decreased (314). This can indicate that the rule is supposed to trigger and is triggering, so the rule may not need immediate attention. However, if the rule, at a later time, continues to trigger frequently, then the rule may be assigned a higher score since this can indicate that the rule may need to be reviewed (e.g., the rule may be responding well to known events but may not be triggering for new variants of the known events).

If the rule triggered less than the threshold value, then the score for the rule can be increased (316). This can indicate that the rule is supposed to trigger, but the rule has not been triggering as often as it is expected to trigger. This can also indicate that the rule is triggering most of the time as it is supposed to, however the rule is missing some events that the rule is also supposed to respond to. The higher score can indicate that the rule should be reviewed to determine whether the rule needs to be modified to respond to the events that have been missed.

Next, the system 102 can determine whether cases where the rule triggered exceeds a threshold value (318). A goal can be to have 80% true positives above the expected 20% false positive threshold. One or more other ratios can be preferred for different entities and/or based on entity and/or user preference. As an example, the cases can be false positives. So, if the number of false positives is equal to or greater than 20% of all times that the rule was triggered, the score can be increased (see below, 320). One or more other considerations can be used for identifying the cases including but not limited to whether the rule is intended to and in fact did trigger for business justified purposes, non-malicious intent, malicious intent, etc.

If the cases exceed the threshold value, then the score for the rule can be increased (320). For example, if the rule triggered in response to more false positives than true positives over a certain period of time and the rule is supposed to respond to malicious intent events, then the cases of false positives exceeds the threshold value. The rule may require attention and modification. Thus, the rule can be assigned a higher score. As another example, if the rule is supposed to respond to non-security events and alerted when it should not have, then the cases exceeds the threshold value and the score can be increased for the rule. As yet another example, if the rule is supposed to alert for business justified events but alerts for non-business justified events, then the rule can be assigned a higher score since it is not performing as intended.

If the cases do not exceed the threshold value, then the score for the rule can be decreased (322). In the example above regarding the rule that is supposed to respond to malicious intent events, if all cases where the rule triggered were malicious intent events, then the rule is considered to be properly triggering (e.g., the rule fired on the events and remediation was taken). Thus, the score can be lower and the rule may not require immediate attention.

Next the system 102 can determine whether the rule type targets high risk threats (324). High risk threats can be identified based on a source of the threats, intention or target of the threats, what or who is the threat actor(s), etc. For example, the threat actor can be a malware type that can and should be recognized by one or more rules. The malware type can be identified based on whether the system 102 and/or the users are aware that the particular malware type is occurring in the environment or other environments, how old the malware type is, whether the malware type caused a rule to trigger, and whether other cases are directed to this same malware type. Block 324 can help identify whether detection rules currently excited for this threat actor, whether the threat actor has come into the environment before (e.g., appeared in the same log records or other log records), what rules did trigger in response to this threat actor and how they responded, and/or what is a success rate of catching the threat actor with the existing rules. The rule type can be defined at a backend, for example, by the detection hub system 102 and/or the network security system 104. In some implementations, the users can also define the rule types and thereby cause certain rules to be weighted more heavily or more importantly than other rules.

If the rule type does target high risk threats, then the score for the rule can be increased (326). For example, if the rule is supposed to target a certain type of threat actor and the rule was not successful in targeting that type, then the score can be increased because it is likely that the rule should be reviewed and/or modified to have a better success rate. As another example, even if the rule is supposed to target high risk threats and the rule did trigger in response to high risk threats, the score can be increased such that the rule can be reviewed and potentially updated to accommodate for new types of high risk threats. Rules that target high risk threats, can be weighted more than rules that do not target high risk threats. It can be advantageous to continuously check rules that target high risk threats to ensure that they are adequately responding to known, current, and new types of threats.

If the rule type does not target high risk threats, then the score for the rule can be decreased (328). As mentioned above, rules that do not respond to high risk threats may not be as important for immediate modification and/or review. These rules can therefore be weighted less than the rules that respond to high risk threats. Moreover, if the rule does not target high risk threats and it has a high success rate with its case outcomes, then the rule can be assigned an even lower score. If, however, the rule does target high risk threats and has a high success rate with its case outcomes, the rule may still be assigned a higher score relative to the rule that does not target high risk threats. This is because, as mentioned above, rules that target high risk threats can be weighted more heavily.

Next, the system 102 can determine whether modifications were made to the rule in less than a predetermined timeframe (320). The more recent that a rule was looked at and/or modified, the rule may be less of a priority for review at a current time. Rules that may not have been looked at and/or modified recently may receive a higher score because the rules can be out of date and therefore not as effective or responsive to changes or variants in network activity. The predetermined timeframe can be different based on rule type. For example, rules that target high risk threats can have shorter timeframes because it can be preferred that such rules are continuously reviewed and updated to respond to new variants of events as they occur. On the other hand, rules that target non-malicious risk events can have longer timeframes because these rules may not be as important in thwarting attacks or other security threats. Therefore, there can be less immediacy to review and/or update these rules.

If the modifications were made within the predetermined timeframe, then the score for the rule can be decreased (332). For example, if modifications were made within the past 7 days, then the rule may not require immediate attention. If, as another example, the rule was modified within the past 7 days but the rule has a low success rate in case outcomes, then the score can be higher. This can indicate that the modifications were not effective.

If the modifications were not made within the predetermined timeframe, then the score for the rule can be increased (334). For example, if the rule was never modified and the rule has existed for over a predetermined amount of time, then the rule can be assigned a higher score. It may be possible that the rule is not functioning properly nor responding to new variants in network activity. As another example, if the rule was modified but it was modified outside of the window created by the predetermined timeframe (e.g. the rule was modified 30 days ago and the window is the past 7 days), then the rule may be out of date and therefore may require attention and/or modification.

Once the system 102 finishes scoring the rule for this iteration (e.g., assigning a base score and increasing and/or decreasing the score according to the decisions in 306, 312, 318, 324, and 330), the score can be finalized (335). As mentioned, in some implementations, each of the decisions 306, 312, 318, 324, and 330 can produce sub-scores. These sub-scores can be combined to generate an overall score for the rule in 335. The overall score can be a sum, average, mean, min, max, or median of the sub-scores. In some implementations, a base score can be generated and increased and/or decreased based on the decisions in 306, 312, 318, 324, and 330. Finalizing the score in 335 can also include weighting and/or normalizing the score as well as any one or more of the sub-scores.

The system 102 can then store the score for the rule (336). The score can be transmitted to the log results data store 110 and/or the rules data store 108 for storage. The score can be associated with a rule identifier of the rule and optionally the executed log record such that the score can be more easily identified and/or retrieved for further analysis and processing.

The system 102 can then determine whether there are additional triggered rules in the log results (338). If there are, then blocks 304-336 can be repeated for each of the remaining triggered rules. If there are no more triggered rules, then the process 300 can stop. The system 102 can then rank the scored rules, as depicted and described in reference to FIG. 4.

Any one or more of decisions 306, 312, 318, 324, and 330 can be performed in any order. For example, a base score can be generated based on whether the triggered rule was modified within the predetermined timeframe (330). Then, the score for the rule can be adjusted up and down based on any of the other factors that are considered in generating an overall score for the rule. Moreover, as described herein, each of the decisions 306, 312, 318, 324, and 330 can result in generation of respective sub-scores. The sub-scores can then be combined and weighted to determine an overall score for the rule. In some implementations, one or more of the sub-scores can be weighted more than other sub-scores. Moreover, in some implementations, the overall score for the rule can be an average, mean, median, minimum, maximum, or sum of the sub-scores.

In some implementations, the process 300 can be performed in the inverse. For example, with regards to block 306, if the number of times the rule was properly triggered exceeds the threshold value, then the score for the rule can be higher rather than lower. In block 312, if the rule triggered more than a threshold value, then the score can be increased instead of decreased. In block 318, if cases where the rule was triggered exceeded the threshold value, then the score can be decreased instead of increased. In block 324, if the rule type targets high risk threats, then the score can be decreased instead of increased. In block 330, if rule modifications were made within the predetermined timeframe, then the score can be increased instead of decreased. In such implementations, a lower score can indicate a greater need to review and/or modify the rule. In some implementations, a high score can still indicate a greater need to review and/or modify the rule, even if the decisions in the blocks 300, 306, 312, 318, 324, and 330 are in the inverse. For example, if the rule triggered more than the threshold value, the score for the rule can be increased and the users can decide that this rule requires attention because the rule may not be intended to trigger as much as it has triggered and some of the triggers may in fact be false positives (312). Similarly, if the cases where the rule triggered exceeds the threshold value, the score can be decreased because the users may have decided that this is an indication that the rule is triggering the right cases or having the right case outcomes and/or that the rule is supposed to trigger frequently (318).

Any one or more of the threshold or predetermined values described in reference to the process 300 can be determined by the users and/or the detection hub system 102. The values can also dynamically change based on results from executed logs, modifications made to one or more rules, case outcomes, rule rankings, and scores of different rules. Moreover, in some implementations, one or more of the threshold or predetermined values can change for one or more rules that were triggered within the same log execution. For example, threshold values can be different for rules that are intended to respond to security threats (e.g., threshold values can be lower so that these rules can be weighted more heavily, assigned higher scores, and more frequently reviewed than other rules) versus rules that are intended to report out on security threats, not respond to security threats, or otherwise respond to non-security events.

Moreover, any one or more of the decisions in blocks 306, 312, 318, 324, and 330 can be determined based on one or more different predetermined timeframes. For example, the user or the detection hub system 102 can determine that the rules should be scored based on their performance over the past 180 days. This 180-day timeframe can be considered and applied to the decisions in blocks 306, 312, 318, 324, and 330. In some implementations, different predetermined timeframes can be applied to different decisions in 306, 312, 318, 324, and 330. For example, the decision in block 306 can be determined based on rule performance over the past 180 days while the decision in block 330 can be determined based on rule modifications over the past 7 days.

FIG. 4 is a flowchart of a process 400 for ranking triggered rules that have been scored. The rules can be ranked relative to other rules in a same executed log record. The rules can also be ranked relative to rules from other log records. The process 400 can be performed by the detection hub system 102. One or more of the blocks in the process 400 can also be performed by other similar computing systems.

Referring to the process 400 in FIG. 4, the system 102 can receive all rule scores (402). The system 102 can receive the rule scores that were stored in the log results data store and/or the rules data store 108. As mentioned, the system 102 can receive all rule scores for rules that were triggered in a particular log record. The system 102 can also receive rule scores for rules that were triggered in multiple different log records. In the latter, one or more parameters can be used to determine which rule scores to receive. For example, rule scores can be received for all log records that were executed within a certain timeframe. As another example, the rule scores can be received for all log records wherein the associated rules are intended to respond to high risk threats.

Once the system 102 receives the rule scores, it can generate an initial ranking of the rules (404). The rules can be ranked from highest to lowest score, where the highest score indicates that the rule needs the most immediate attention and review or modification.

One or more use cases can be applied (406). The use cases can be applied to determine which scored rules should be prioritized over other scored rules in the initial ranking. In some implementations, the system 102 can apply more than 1 use case, such as 15-20 use cases. Each of the use cases can test a different characteristic of the rules and increment or decrement the score for the rules accordingly (e.g., refer to FIG. 10). For example, one use case can be used to prioritize ranked rules that are associated with point-of-sale (POS) terminals. If, for example, a ranked rule is associated with POS terminals (e.g., the rule's identifier links to POS functionality in a database, the rule is labeled or tagged with POS), that rule's score can receive an arbitrary number of points, or otherwise be increased by an arbitrary amount. As the score is increased, the rule can jump higher in the ranking of overall rules. Another use case can be used to prioritize rules that triggered the most or above a threshold value over a certain period of time. For example, a rule that triggered more than other relatively ranked and scored rules over the past 180 days can be assigned an arbitrary number of points, thereby bumping the rule higher up in the rankings. Other use cases can be used to deprioritize ranked rules. Use case can deprioritize rules that are tagged a certain way, rules that were recently modified, rules of certain rule types, etc. For example, if the analysts prefer not to prioritize alerts from rules that have resulted frequently in cases that are tagged as business justified, then those tagged alerts can be deprioritized relative to other ranked alerts. As another example, if the users know that the rule is properly functioning (e.g., the rule was independently verified and/or some other verification process was used), then the rule can be deprioritized.

In some implementations, the detection hub system 102 can automatically determine which use case(s) to apply (406). In some implementations, the users (engineers) can device which use case(s) to apply. In some implementations, the users can also apply fewer or more use cases at different times in the ranking and/or scoring process.

Still referring to the process 400, once the use case(s) is applied, the system 102 can select a rule from the ranked rules (408). The system 102 can determine whether the selected rule satisfies the use case (410). If it does, then the rule's score can be lowered relative to scores of its nearest neighbors (412). If it does not, then the rule's score can be raised relative to the scores of its nearest neighbors (414). In some implementations, the lowering and raising of the score can be in the inverse. This can depend on how the use case is structured. For example, if the use case is used to deprioritize rankings, then if the rule satisfies the use case, the rule's score can be lowered. The rule, therefore, may not require immediate attention or modification. On the other hand, if the use case is used to prioritize rankings, then if the rule satisfies the use case, the rule's score can be raised. This can indicate that the rule is more important than other relatively ranked scores and may require more immediate attention or modification.

Raising and lowering the scores can include shifting the scores by predetermined amounts relative to each other. For example, assume rule A has a score of 990 and rule B has a score of 1000. If rule A does not satisfy the use case, it's score can be raised by 11 points to 1001 such that rule A can be ranked above rule B. The amount of points that a score is raised or lowered can be dynamic and relative to the nearest neighbor rule scores. In some implementations, the amount of points that a score is raised or lowered can be a fixed amount, as determined by the detection hub system 102 and/or the users (e.g., refer to FIG. 10). For example, one use case can require 15 points to be added to every rule that satisfies the use case.

Raising and lowering the scores can also include merely shifting the rules in their rankings rather than modifying their scores. For example, if a rule satisfies the use case, it can be moved to a priority level directly below its lower nearest neighbor. Thus, the rule can be shifted down one in priority. In some implementations, the rule can be shifted above or below a predetermined number of nearest neighbors in those directions.

Once the selected rule's score is adjusted, the system 102 can determine whether there are additional ranked rules (416). If there are, then blocks 408-414 can be repeated for every remaining rule. Therefore, the rules can continue to be ranked relative to each other and relative to rules that are already ranked based on application of the use case(s). If there are no more ranked rules, the system 102 can finalize the rule rankings from highest to lowest score (418). For example, the system 102 can verify that, after scores and/or rankings have been adjusted based on use case application for each rule, the rules appear in the proper ranking from highest score to lowest score.

The system 102 can then generate output for the ranked rules (420). As described herein, the output can include visual representations, reports, graphs, and/or charts depicting the ranked rules (e.g., refer to FIGS. 5-9).

Figure 5A:
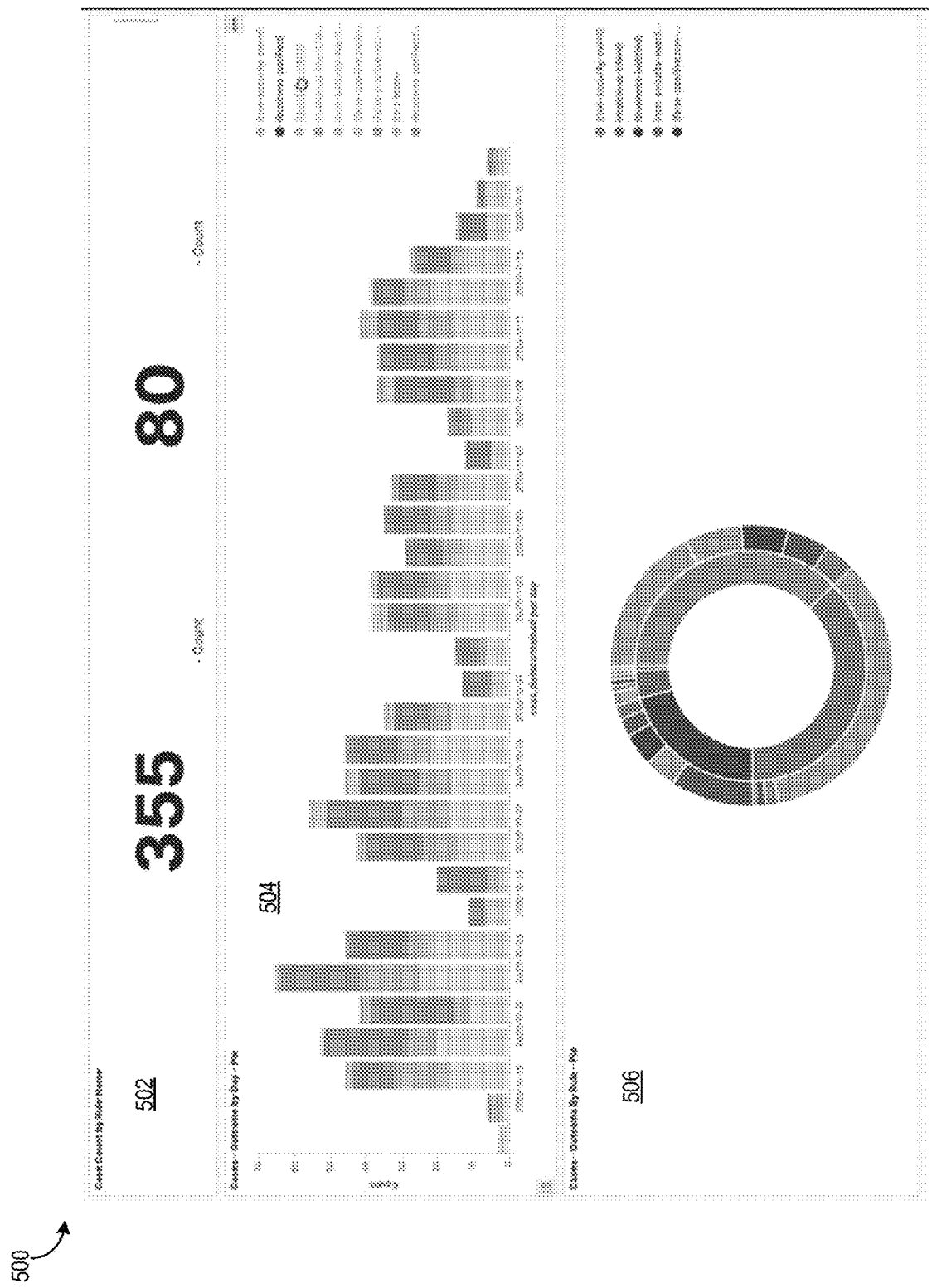
FIGS. 5A-B are example graphical user interfaces (GUI) depicting visual displays of scored rules.
Figure 5B:
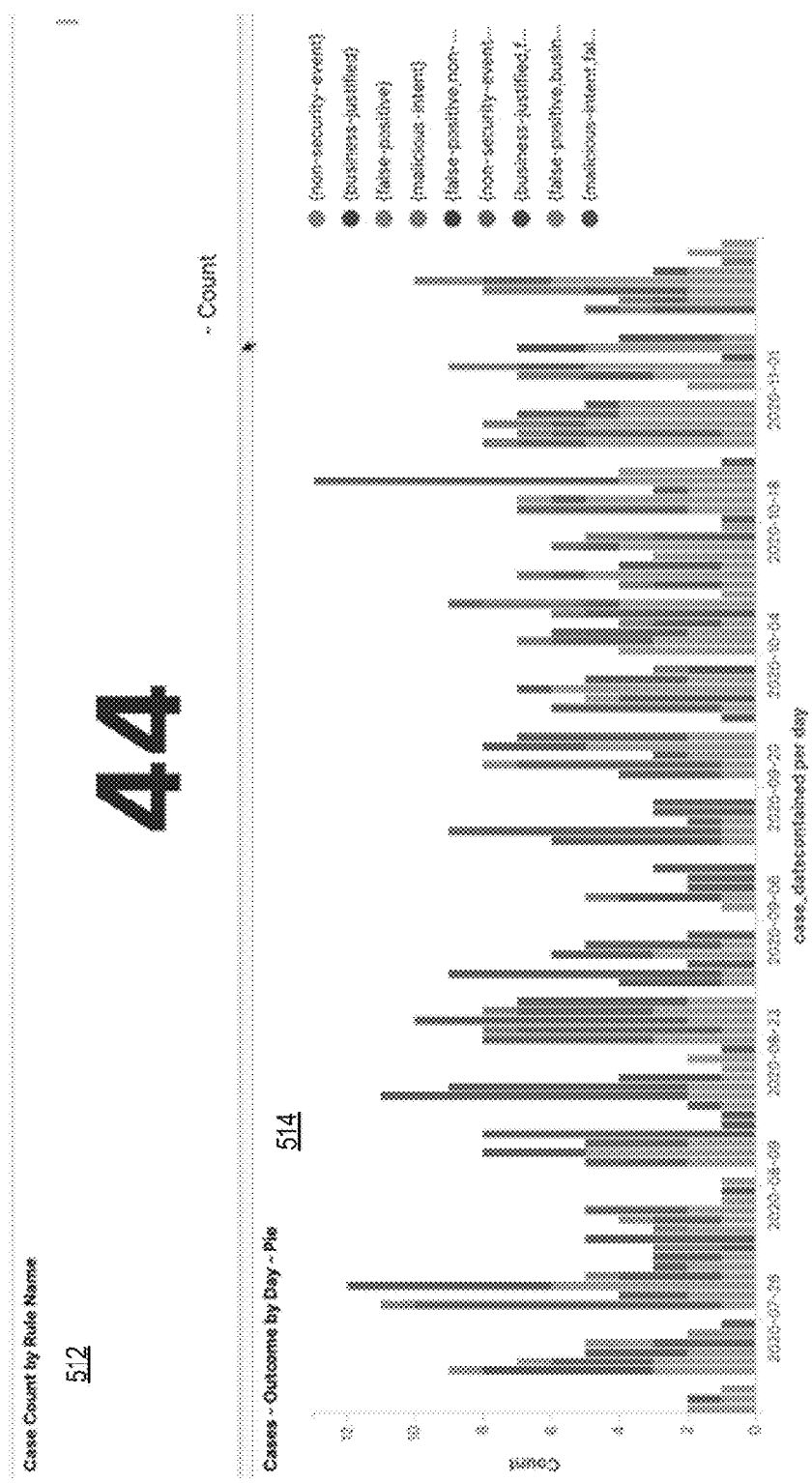

FIGS. 5A-B are example graphical user interfaces (GUI) 500 and 510 depicting visual displays of scored rules. FIG. 5A's GUI 500 depicts an overall output interface that can be presented to the users at the user device 106. The GUI 500 can include one or more displays, such as 502, 504, and 506. Display 502 depicts case count by rule name. Display 504 depicts a bar graph of case outcomes by day. Display 506 depicts a pie chart of case outcomes by rule. The GUI 500 can demonstrate overall outcomes, including information about malicious intent events, business justified events, false positives, and overall rule performance (e.g., whether or not the rule performed as expected). For malicious intent events, it can be preferred to display information about whether the triggered rules had true positives or otherwise fired as intended. For business justified events, it can be preferred to display information about whether these events were cleared or verified by users. In some implementations, it can be preferred to have some alerting of business justified events because it can be possible that the events were in fact malicious. For false positives, it can be preferred to display information about whether the rules match on something properly but they're not threat matches. In some implementations, it can be preferred to have 0% false positives or 1% false positives, such that there is some play or flexibility in the rules. 100% true positives may not be the most telling about rule performance because it can indicate that the rule responds to known events but does not respond to new variants of known or unknown events.

As shown in the display 502, two rules are displayed, identified by their rule identifiers. One of the rules had a case count of 355. The other rule had a case count of 80. One or more additional or fewer rules can also be identified in the display 502. In some implementations, the rules having the highest scores and/or rankings can be displayed in the display 502. In some implementations, the users can select which rules they prefer to see in the display 502, the display 504, and/or the display 506.

Display 504 depicts what case outcomes occurred each day. Each bar in the display 504 represents a single timeframe's cases. Each bar can further be broken up into segments indicating different case outcomes. As shown, each day, portions of the case outcomes were non-security events and portions of the case outcomes were business justified. If the rules are intended to catch security events and they are triggering mostly for non-security and business justified events, then the rules may require attention and modification because they are not functioning properly. Business justified events can relate to actual business activities that are expected to occur. When the rules are triggering frequently for the business justified events, it can slow down an ability of the security system to identify and respond to security threat events. Therefore, the rules should be modified so that they respond less frequently to business justified events, thereby taxing the security system less. Non-security events that alert may not be indicative of a risk and may need further review or service.

The graph in the display 504 can also be advantageous to depict how, over time, as the rules are modified, the case outcomes change per day. For example, on Nov. 9, 2020, the rules that trigger frequently to business justified events can be modified. Such rules can be fed back into the system. Since Nov. 9, 2020 and through Nov. 5, 2020, the count of business justified case outcomes has decreased. This can indicate that the modifications made to the rules were effective in reducing how frequently the rules triggered for business justified events.

The pie chart in display 506 can indicate case outcomes by rule name. An outer ring of the pie, for example, can indicate the rules that were triggered. An inner ring of the pie can indicate the case outcomes. Rules that were triggered more often can fill larger portions of the outer ring (e.g., have higher percentages or counts for being triggered). Similarly case outcomes that were more frequent can fill larger portions of the inner ring (e.g., have higher percentages or counts for occurring). As described in reference to the display 504, the business justified and non-security events were the most common case outcomes (as demonstrated by larger filled sections of the inner ring). Moreover, the non-security events triggered at least 5 different rules. Some of the rules that were triggered for the non-security events were also triggered for malicious intent events. Such rules can be scored and ranked higher because they may require more immediate attention and modification such that they trigger more appropriately. Additionally, approximately 5 different rules were also triggered for business justified events. Those rules can also be scored and ranked higher so that they can be modified to trigger less in response to business justified events. As mentioned above, frequent triggering for business justified events can slow down the system's ability to effectively and quickly respond to real threats, such as malicious intent events.

FIG. 5B's GUI 510 depicts trending of a rule over time. Similar to the GUI 500 in FIG. 5A, the GUI 510 can include displays 512 and 514. The display 512 can depict a case count by rule name. The display 514 can include a bar graph that depicts case outcomes by day for a particular rule (e.g., the rule identified in the display 512). The rule in the display 512 can be identified by its rule identifier. As shown, the rule in the display 512 triggered 44 times over approximately 3 months. The 44 triggers can be over a predetermined amount of time that is selected by the user and/or determined by the detection hub system 102.

As shown in the graph in the display 514, the rule was triggered for a significant amount of business justified and false positive events. This rule can be assigned a higher score because it may require modification such that it triggers less for business justified and/or false positive events. The user can hover over or select any portion of the bars in the graph to view additional information. The additional information can include, but is not limited to, a timestamp for the case outcome, a classification of the case outcome (e.g., business justified, malicious intent, non-security event, etc.), and a quantity of that case outcome for that particular day or time period.

The graph in the display 514 can trend during a chosen amount of time. In some implementations, the graph may have fewer events on days that are weekends rather than business days. Therefore, smaller case counts or fewer outcomes on dates that are weekends may not be true indicators of overall rule performance. On the other hand, if the quantity of case counts and/or outcomes increases over the weekends, then the rule can be assigned a higher score because the rule may not be functioning properly or as intended.

Figure 6:
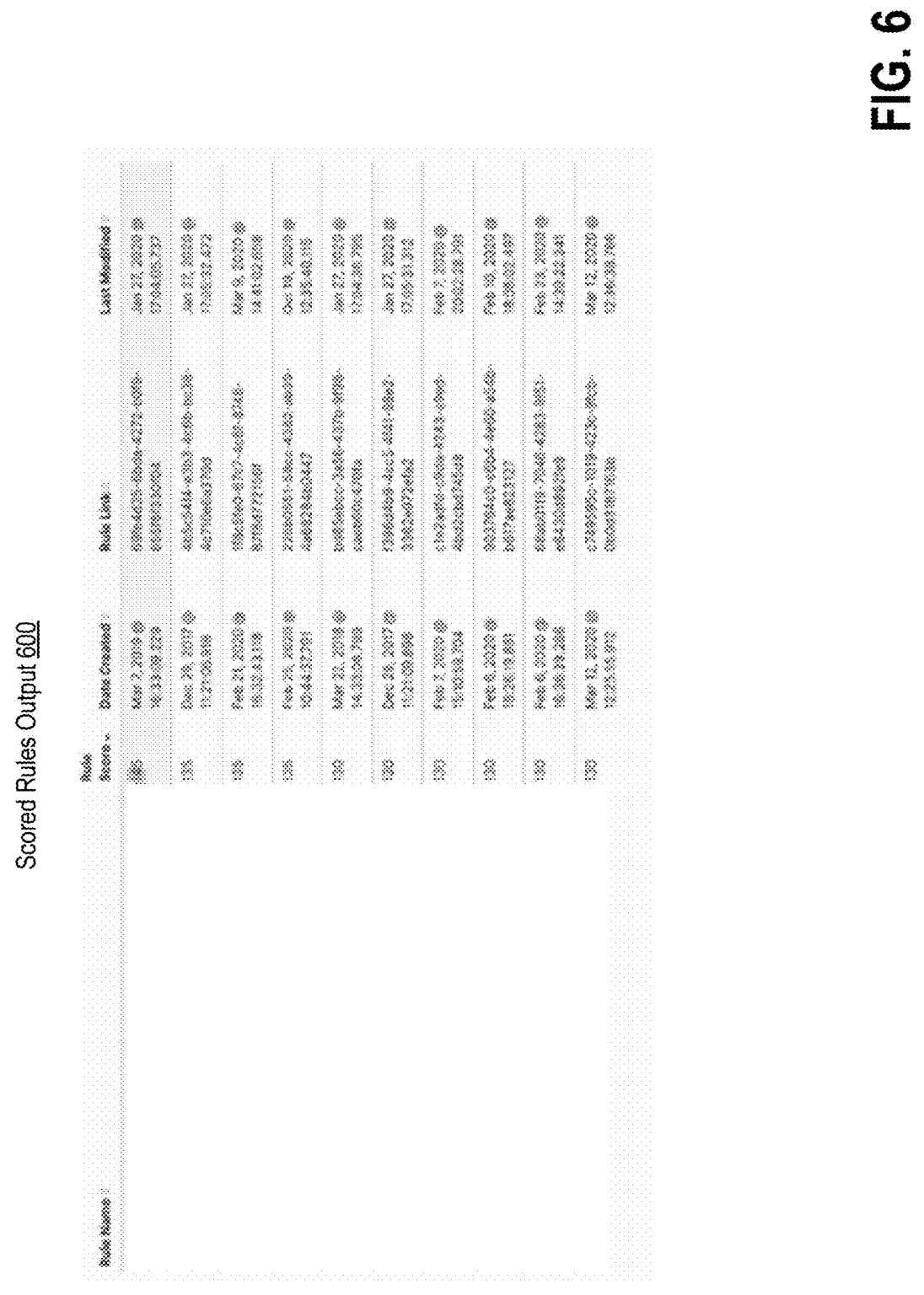

FIG. 6 is an example GUI report 600 depicting scored rules that are ranked from highest score to lowest score. The report 600 can include information such as the rule names, overall score for each rule, date that the rule was created, a link to the rule, and a date when the rule was last modified. The report 600 can include one or more other information based on user preference. The information presented in the report 600 can be advantageous to assist the users in more quickly assessing how the rules performed and determining how to modify such rules.

For example, the first rule depicted in the report 600 has an overall score of 145, the highest score of the ranked rules. Moreover, the rule was created on Mar. 7, 2019 and was last modified on Jan. 27, 2020. The lack of more frequent modifications can be a reason why this rule is ranked higher than the other rules. This can be an indication to the users that they should address and modify the rule before they modify other rules. The users can quickly access information about the rule, including an interface to modify the script or code for that rule, via the rule link. Therefore, the report 600 can present useful information to the users for quick and easy access, review, and modification of ranked rules.

The report 600 can be generated for the rules that are depicted and outputted in any of the other GUIs described herein (e.g., the GUIs 500 and 510 in FIGS. 5A-B). As shown, rules requiring the most immediate attention can be ranked higher in the report 600, thereby focusing the users' attention on those rules. In some implementations, the rules with higher scores may be triggering too frequently. This can be a sign of insufficient specificity to identify malicious activity. In some implementations, the report 600 can include information indicating why the rules were assigned the scores that appear in the report 600. For example, the report 600 can include an indication of what was alerted on by each of the rules (e.g., false positives, malicious intent events, business justified events, events that are inconsequential and/or should be ignored, etc.). In some implementations, the report 600 can also provide one or more suggestions for modifying any of the ranked rules.

Figure 7:
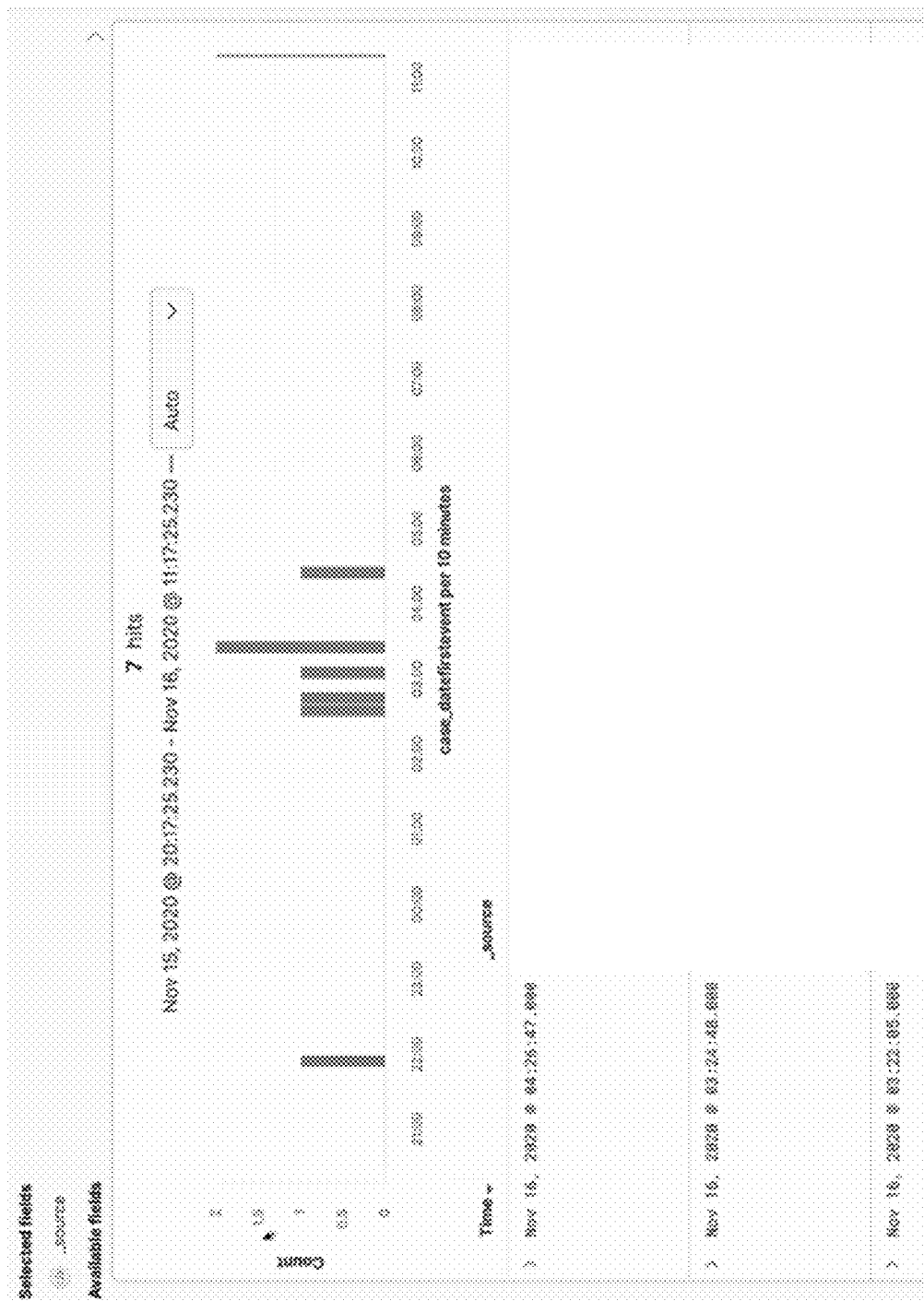
FIG. 7 is an example GUI output of an executed log of events.

FIG. 7 is an example GUI output 700 of an executed log of events. This view can provide the users with an overview of what happened in a log that was executed by the network security system 104. For example, the output 700 indicates that over 16 hours, there were 7 hits. The users can hover or click on each of the 7 hits to view more information about the case(s) associated with each of the hits, what rules triggered, and what happened in each hit. From this view, the user can also view information about the particular rules that triggered in response to the hits (e.g., the users can access the scripts or source code for the rules).

The users can also create search and view parameters to view different information in the output 700. For example, the users can narrow the hits to only depict hits involving business justified events for that executed log of events. This narrowed output 700 can be advantageous to determine whether the business justified events were verified or whether they were actually malicious. If they were verified, then these hits are not as important and the users may not need to immediately assess the rules that were triggered.

As another example, the users can expand the output 700 to include all hits for all logs that executed during a predetermined timeframe. This more expansive output 700 can be advantageous to determine which rules were frequently triggered in the environment and how they performed. If a particular rule triggered more than a predetermined amount of times across a predetermined number of executed logs, then that rule may not be performing as intended and therefore should be more immediately reviewed by the users.

As yet another example, the user can search for rules based on type of threat actor. The user can view historic case outcomes and rules associated with the threat actor. The user can view how many rules are associated with the threat actor, whether any of the rules have been updated, which of the rules have been updated, how many of those rules alerted over a certain period of time, etc. Thus, the user can have a more holistic, aggregated view of all rules and/or cases associated with a selected threat actor. The user can expand on this view on a more granular level. Once the user has an aggregated view for the specific threat type, the user can also develop more granular searches and views associated with case outcomes and specific rules that were triggered. All this information in a consolidated output can be advantageous to provide the user with more awareness about the threat actor, what rules can respond to the threat actor, and what rules may need to be modified to better catch and/or respond to the threat actor. Any one or more additional search parameters can be used to assist the users in assessing which rules require more immediate attention and modification.

Figure 8:
FIG. 8 is an example GUI output of a scored rule case outcome.

FIG. 8 is an example GUI output 800 of a scored rule case outcome. In this example, the user searched for the rule having "Threat_Actor_X" in its identifier/name. The user also selected to view information about this rule over the last 30 days. The user can select different parameters to see a trend for this rule over time. The trending can indicate whether the rule improved and/or deteriorated. This rule has a case count of 14, which indicates that the rule was triggered 14 times over the last 30 days. A bar graph indicates the case outcomes count by day for this particular rule. On days such as Nov. 3, 2020 and Nov. 11, 2020, the case outcomes were mostly or all non-security events. Only a small portion of the outcomes were malicious intent. None of the case outcomes were non-security events or business justified events. This can indicate that the rule is not functioning properly, because the rule should be triggering in response to more malicious intent events rather than non-security events.

FIG. 9 depicts example GUI outputs 900 and 910 for case outcomes by rule. As described throughout this disclosure, the case outcomes by rule can be depicted in a dual ring pic graph. The outer ring can indicate rules that were triggered along with their associated case outcomes. The inner ring can indicate only the case outcomes. In the example depicted in FIG. 9, there are only 5 case outcomes: a first non-security event, malicious intent, business justified, a second non-security event that includes business justified, and false positives.

The output 900 indicates some of the information that can be presented to the user when the user hovers over or selects one of the portions of the outer ring. For example, the information can include the rule identifier, an indication of the case outcome associated with the rule, how many total times that case outcome occurred, and how many of those times was the particular rule triggered. In the depicted example, the rule triggered for the business justified case outcome. In total there were 76 times that the business justified outcome resulted, which can be 20.65% of all case outcomes. Of those 76 times, the highlighted rule triggered in response to 23 of those business justified outcomes, or approximately 46%.

The output 910 indicates some of the information that can be presented to the user when the user hovers over or selects one of the portions of the inner ring. As mentioned, the inner ring identifies only the case outcomes. In this example output 910, of the 5 case outcomes, the user is hovering over the business justified outcome. The displayed information can include an indication of the case outcome as well as a total amount of times that the case outcome resulted. In this example, the user is hovering over the business justified case outcome. This outcome occurred 76 times, which can be approximately 20.65% of all case outcomes.

FIG. 10 is example use case code 1000 for ranking scores relative to each other. This example code 1000 can be used to rank rules based on two use cases. A first use case can be used to rank scores based on whether they are test rules are rules that are actually supposed to fire and respond to real events. A second use case can be used to rank rules based on how many times each rule was triggered.

For the first example use case, if one of the triggered rules has an identifier or tag that is "test," then the score for that rule can be lowered by an arbitrary amount of points—in this example, the amount of points is 10. If the rule does not have a "test" identifier or tag, then the score for that rule can remain the same. In other words, the ranking may not change for rules that are not test rules. By decreasing the scores of test rules, those rules can be lowered in their rankings. This can be advantageous to direct the users' attention to rules that are actually triggering in response to real events, such as security threats rather than rules that they are merely testing.

For the second example use case, if one of the triggered rules triggered more than or equal to 50 times, then the rule's score can be increased by an arbitrary amount of points—in this example, the amount of points is 10. If the rule did not trigger at least 50 times, then the rule's score can be lowered by an arbitrary amount of points—in this example, the amount of points is 5. Increasing the score of rules that trigger frequently can raise the rankings of such rules, thereby bringing the users' attention to those rules. As mentioned throughout, a rule that triggers more than an expected amount may not be functioning properly relative to other triggered rules. Therefore, the frequently triggered rules can be increased in the overall ranking so that they can be reviewed more immediately by the users.

As described throughout this disclosure, multiple use cases can be applied to rank the scored rules. The use cases can test different scenarios, factors, and/or characteristics. For example, a use case can increase rankings for rules that, relative to nearest neighbor ranked rules, have not been modified within a predetermined amount of time (e.g., 20 days, 30 days, 180 days, etc.). A use case can also increase or raise rankings for rules that, relative to nearest neighbor ranked rules, are associated with high risk or security events. For example, if security at point-of-sale (POS) terminals is very important, rankings can be increased for rules that are associated with (e.g., tagged with) POS terminals. Any one or more additional use cases can be generated and applied by the detection hub system 102 and/or the users to improve ranking of the scored rules.

Figure 11:
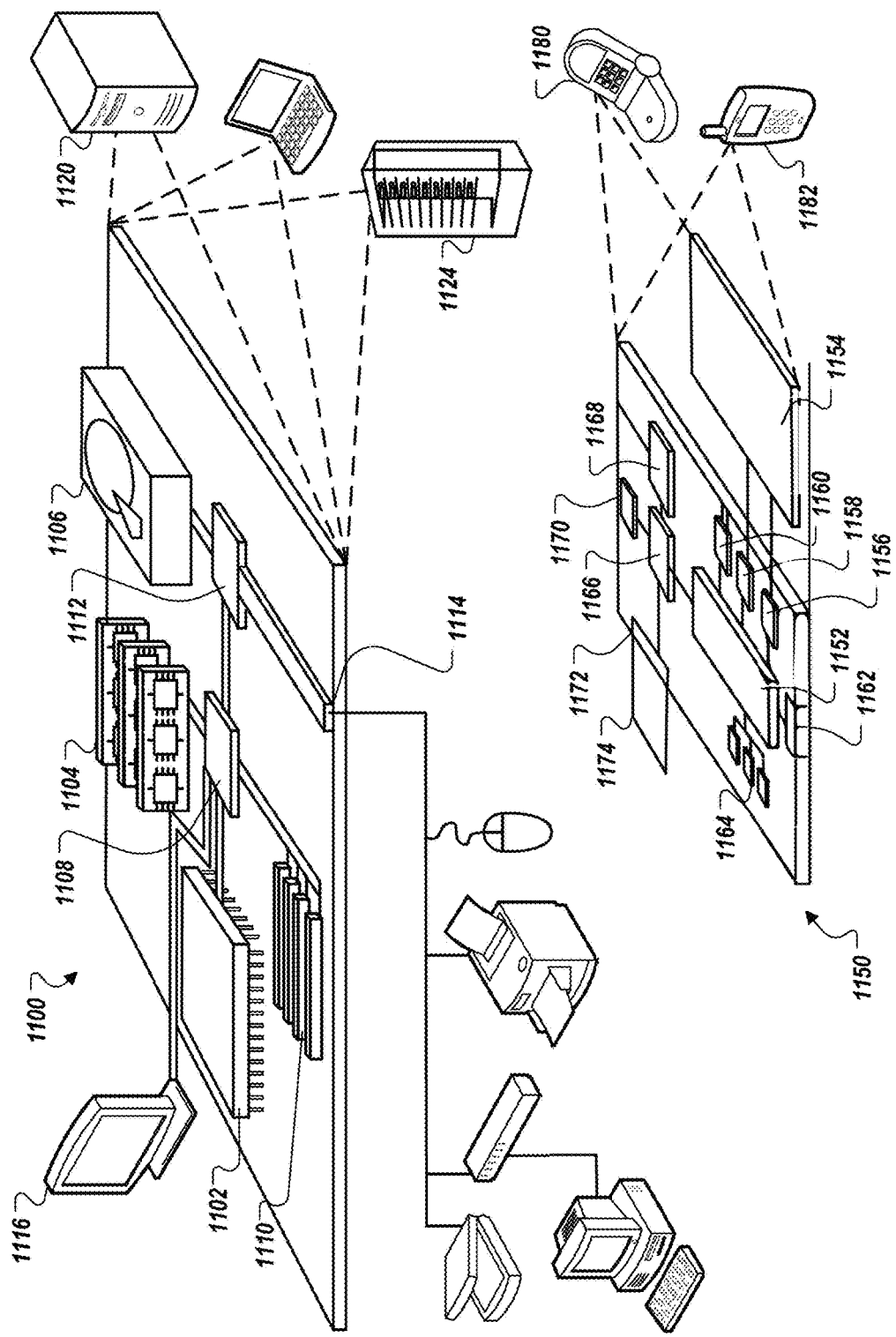
FIG. 11 is a schematic diagram that shows an example of a computing device and a mobile computing device.

FIG. 11 shows an example of a computing device 1100 and an example of a mobile computing device that can be used to implement the techniques described here. The computing device 1100 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 1100 includes a processor 1102, a memory 1104, a storage device 1106, a high-speed interface 1108 connecting to the memory 1104 and multiple high-speed expansion ports 1110, and a low-speed interface 1112 connecting to a low-speed expansion port 1114 and the storage device 1106. Each of the processor 1102, the memory 1104, the storage device 1106, the high-speed interface 1108, the high-speed expansion ports 1110, and the low-speed interface 1112, are interconnected using various busses, and can be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as a display 1116 coupled to the high-speed interface 1108. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1104 stores information within the computing device 1100. In some implementations, the memory 1104 is a volatile memory unit or units. In some implementations, the memory 1104 is a non-volatile memory unit or units. The memory 1104 can also be another form of computer-readable medium, such as a magnetic or optical disk.

The storage device 1106 is capable of providing mass storage for the computing device 1100. In some implementations, the storage device 1106 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 1104, the storage device 1106, or memory on the processor 1102.

The high-speed interface 1108 manages bandwidth-intensive operations for the computing device 1100, while the low-speed interface 1112 manages lower bandwidth-intensive operations. Such allocation of functions is exemplary only. In some implementations, the high-speed interface 1108 is coupled to the memory 1104, the display 1116 (e.g., through a graphics processor or accelerator), and to the high-speed expansion ports 1110, which can accept various expansion cards (not shown). In the implementation, the low-speed interface 1112 is coupled to the storage device 1106 and the low-speed expansion port 1114. The low-speed expansion port 1114, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1100 can be implemented in a number of different forms, as shown in the figure. For example, it can be implemented as a standard server 1120, or multiple times in a group of such servers. In addition, it can be implemented in a personal computer such as a laptop computer 1122. It can also be implemented as part of a rack server system 1124. Alternatively, components from the computing device 1100 can be combined with other components in a mobile device (not shown), such as a mobile computing device 1150. Each of such devices can contain one or more of the computing device 1100 and the mobile computing device 1150, and an entire system can be made up of multiple computing devices communicating with each other.

The mobile computing device 1150 includes a processor 1152, a memory 1164, an input/output device such as a display 1154, a communication interface 1166, and a transceiver 1168, among other components. The mobile computing device 1150 can also be provided with a storage device, such as a micro-drive or other device, to provide additional storage. Each of the processor 1152, the memory 1164, the display 1154, the communication interface 1166, and the transceiver 1168, are interconnected using various buses, and several of the components can be mounted on a common motherboard or in other manners as appropriate.

The processor 1152 can execute instructions within the mobile computing device 1150, including instructions stored in the memory 1164. The processor 1152 can be implemented as a chipset of chips that include separate and multiple analog and digital processors. The processor 1152 can provide, for example, for coordination of the other components of the mobile computing device 1150, such as control of user interfaces, applications run by the mobile computing device 1150, and wireless communication by the mobile computing device 1150.

The processor 1152 can communicate with a user through a control interface 1158 and a display interface 1156 coupled to the display 1154. The display 1154 can be, for example, a TFT (Thin-Film-Transistor Liquid Crystal Display) display or an OLED (Organic Light Emitting Diode) display, or other appropriate display technology. The display interface 1156 can comprise appropriate circuitry for driving the display 1154 to present graphical and other information to a user. The control interface 1158 can receive commands from a user and convert them for submission to the processor 1152. In addition, an external interface 1162 can provide communication with the processor 1152, so as to enable near area communication of the mobile computing device 1150 with other devices. The external interface 1162 can provide, for example, for wired communication in some implementations, or for wireless communication in other implementations, and multiple interfaces can also be used.

The memory 1164 stores information within the mobile computing device 1150. The memory 1164 can be implemented as one or more of a computer-readable medium or media, a volatile memory unit or units, or a non-volatile memory unit or units. An expansion memory 1174 can also be provided and connected to the mobile computing device 1150 through an expansion interface 1172, which can include, for example, a SIMM (Single In Line Memory Module) card interface. The expansion memory 1174 can provide extra storage space for the mobile computing device 1150, or can also store applications or other information for the mobile computing device 1150. Specifically, the expansion memory 1174 can include instructions to carry out or supplement the processes described above, and can include secure information also. Thus, for example, the expansion memory 1174 can be provide as a security module for the mobile computing device 1150, and can be programmed with instructions that permit secure use of the mobile computing device 1150. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1164, the expansion memory 1174, or memory on the processor 1152. In some implementations, the computer program product can be received in a propagated signal, for example, over the transceiver 1168 or the external interface 1162.

The mobile computing device 1150 can communicate wirelessly through the communication interface 1166, which can include digital signal processing circuitry where necessary. The communication interface 1166 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1168 using a radio-frequency. In addition, short-range communication can occur, such as using a Bluetooth, WiFi, or other such transceiver (not shown). In addition, a GPS (Global Positioning System) receiver module 1170 can provide additional navigation- and location-related wireless data to the mobile computing device 1150, which can be used as appropriate by applications running on the mobile computing device 1150.

The mobile computing device 1150 can also communicate audibly using an audio codec 1160, which can receive spoken information from a user and convert it to usable digital information. The audio codec 1160 can likewise generate audible sound for a user, such as through a speaker, e.g., in a handset of the mobile computing device 1150. Such sound can include sound from voice telephone calls, can include recorded sound (e.g., voice messages, music files, etc.) and can also include sound generated by applications operating on the mobile computing device 1150.

The mobile computing device 1150 can be implemented in a number of different forms, as shown in the figure. For example, it can be implemented as a cellular telephone 1180.

It can also be implemented as part of a smart-phone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A system for evaluating security detection rules in a network security computing environment, the system comprising:
   a log results data store configured to store results data for a processing a log of security events; and
   a computer system for assessing a plurality of security detection rules that are triggered by processing the log of security events, the computer system being configured to:
      receive, from the log results data store, the results data, wherein the results data identifies outcomes for instances triggering the plurality of security detection rules in a network security system;
      generate scores for the plurality of security detection rules based on the results data using a process that comprises:
         determining, for each rule of the plurality of security detection rules, a number of times that the rule was properly triggered;
         assigning a score below a first threshold value based on the number of times that the rule was properly triggered exceeding a second threshold value; and
         assigning a score above the first threshold value based on the number of times that the rule was properly triggered being less than the second threshold value, wherein assigning the score above the first threshold value indicates that the rule is performing worse among the plurality of security detection rules than a rule that is assigned a score below the first threshold value;
      select a portion of the plurality of security detection rules based on the assigned scores; and
      return a rules score report that includes information about the selected portion of the plurality of security detection rules.

2. The system of claim 1, wherein the computer system is further configured to rank the plurality of security detection rules based on:
   applying a use case to each rule of the plurality of security detection rules;
   decreasing, in response to determining that the rule satisfies the use case, a score of the rule; and
   ranking the plurality of security detection rules from highest to lowest scores and based on the decreasing.

3. The system of claim 2, wherein the ranking further comprises:
   increasing, in response to determining that the rule does not satisfy the use case, the score of the rule; and ranking the plurality of security detection rules from highest to lowest scores and based on the increasing.

4. The system of claim 2, wherein the rule satisfies the use case based on the rule being triggered less than a predefined threshold value.

5. The system of claim 2, wherein the rules satisfies the use case based on the rule being identified as a non-malicious event.

6. The system of claim 2, wherein the rules satisfies the use case based on the rule having been modified within a predetermined timeframe.

7. The system of claim 2, wherein the rule satisfies the use case based on the rule being associated with point-of-sale (POS) terminals.

8. The system of claim 2, wherein the use case is configured to deprioritize the rule, and wherein the rule satisfies the use case based on the rule being tagged with a predetermined tag.

9. The system of claim 2, wherein applying the use case to each rule comprises automatically selecting a plurality of use cases to apply to each rule.

10. The system of claim 2, wherein decreasing, in response to determining that the rule satisfies the use case, the score of the rule comprising decreasing the score by a threshold amount relative a nearest neighbor rule amongst the plurality of security detection rules.

11. The system of claim 2, wherein decreasing the score of the rule comprises shifting a ranking of the rule amongst the plurality of security detection rules instead of modifying a value of the score of the rule.

12. The system of claim 1, wherein selecting a portion of the plurality of security detection rules comprises:
applying a first use case and a second use case to each rule of the plurality of security detection rules, wherein the first use case corresponds to ranking the plurality of security detection rules based on whether each rule is tagged as a test rule or a rule configured to fire in response to detection of an actual security event, wherein the second use case corresponds to ranking each rule based on a quantity of times that each rule is triggered;
determining whether each rule satisfies at least one of the first use case and the second use case; and
ranking the plurality of security detection rules based on whether each rule satisfies at least one of the first use case and the second use case.

13. The system of claim 1, wherein the system further comprises: the network security system configured to (i) receive the log of security events for a network and (ii) process the log of security events against the plurality of security detection rules.

14. The system of claim 1, wherein each of the plurality of security detection rules is configured to detect a specific network behavior on a network by processing each of the plurality of security detection rules against the log of security events.

15. The system of claim 1, wherein the log results data store configured to:
receive, from the network security system, the results data for processing the log of security events against the plurality of security detection rules; and
store the results for the processed log of security events as the results data.

16. The system of claim 1, wherein the system further comprises:

a user computing device having a graphical user interface (GUI) display, the user computing device configured to:
receive, from the computer system, the rules score report;
output, for display at the GUI display, the rules score report;
modify, based on the rules score report, one or more of the rules identified in the rules score report; and
store, in a rules data store, the modified one or more rules.

17. The system of claim 1, wherein generating the scores for the plurality of security detection rules further comprises:
assigning the score above the first threshold value based on determining that a predetermined quantity of the number of times that the rule was properly triggered over a predetermined period of time are identified as false positives.

18. A system for evaluating security detection rules in a network security computing environment, the system comprising:
a computer system for assessing a plurality of security detection rules that are triggered by processing a log of security events, the computer system being configured to:
receive results data for a processed log of security events, wherein the results data identifies outcomes for instances triggering the plurality of security detection rules in a network security system;
generate scores for the plurality of security detection rules based on the results data using a process that comprises:
determining, for each rule of the plurality of security detection rules, a number of times that the rule was properly triggered, and
assigning a score below a threshold value based on the number of times that the rule was properly triggered exceeding another threshold value, wherein the assigning indicates that the rule is performing better than a rule that is assigned a score above the threshold value;
apply at least one use case to each instance triggering the plurality of security detection rules according to the results data;
adjust the scores for the plurality of security detection rules based on determining whether each instance triggering the plurality of security detection rules satisfies the at least one use case;
select a portion of the plurality of security detection rules based on the adjusted scores; and
return a rules score report, wherein the rules score report includes information about the selected portion of the plurality of security detection rules; and
a user computing device having a graphical user interface (GUI) display and configured to (i) receive, from the computer system, the rules score report and (ii) output, for display at the GUI display, the rules score report.

19. The system of claim 18, wherein applying the at least one use case comprises:
applying a first use case and a second use case to each instance, wherein the first use case corresponds to selecting the portion of the plurality of security detection rules based on whether each rule is tagged as a test rule or a rule configured to fire in response to detection of an actual security event, wherein the second use case corresponds to selecting the portion of the plurality of security detection rules based on a quantity of times that each rule is triggered;

determining whether each instance satisfies at least one of the first use case and the second use case; and selecting the portion of the plurality of security detection rules based on whether each instance satisfies at least one of the first use case and the second use case.

20. The system of claim 18, wherein the system further comprises: the network security system configured to (i) receive the log of security events for a network and (ii) process the log of security events against the plurality of security detection rules.

\* \* \* \* \*